(12) United States Patent
Johansson

(10) Patent No.: US 8,588,336 B2
(45) Date of Patent: Nov. 19, 2013

(54) METHODS AND APPARATUSES FOR COMPENSATION OF I/Q IMBALANCE

(75) Inventor: Håkan Johansson, Linköping (SE)

(73) Assignee: Signal Processing Devices Sweden AB, Linköping (SE)

( * ) Notice: Subject to any disclaimer, the term of this patent is extended or adjusted under 35 U.S.C. 154(b) by 49 days.

(21) Appl. No.: 13/256,922

(22) PCT Filed: Mar. 20, 2009

(86) PCT No.: PCT/EP2009/053324
§ 371 (c)(1),
(2), (4) Date: Jan. 13, 2012

(87) PCT Pub. No.: WO2010/105694
PCT Pub. Date: Sep. 23, 2010

(65) Prior Publication Data
US 2012/0099673 A1 Apr. 26, 2012

(51) Int. Cl.
*H03C 3/00* (2006.01)
*H03K 7/06* (2006.01)
*H04L 27/12* (2006.01)

(52) U.S. Cl.
USPC ......................................................... 375/302

(58) Field of Classification Search
None
See application file for complete search history.

(56) References Cited

U.S. PATENT DOCUMENTS

2007/0058754 A1* 3/2007 Lin et al. ........................ 375/332
2007/0110254 A1* 5/2007 Christoph et al. ............... 381/66
2007/0291883 A1* 12/2007 Welz et al. ..................... 375/350
2010/0215125 A1* 8/2010 Furman .......................... 375/319
2010/0266067 A1* 10/2010 Eitel .............................. 375/324

FOREIGN PATENT DOCUMENTS

JP 06-090265 3/1994
JP 2008-532381 A 8/2008

OTHER PUBLICATIONS

Anttila L et al: "Circularity-Based I/O Imbalance Compensation in Wideband, Direct-Conversion Receivers" IEEE Transactions on Vehicular Technology, vol. 57, No. 4, Jul. 1, 2008.*
Anttila L et al:- "Gradient-based blind iterative techniques for I/O imbalance compensation in digital radio receivers" In Proceedings of Signal Processing Advances in Wireless Communications, Jun. 1, 2007.*
Anttila L et al: "Blind Compensation of Frequency-Selective I/O Imbalances in Ouadrature Radio Receivers: Circularity-Based Approach" In Proceedings of the IEEE International Conference on Acoustics, Speech, and Signal Processing (ICASSP), vol. III, Apr. 15, 2007.*

(Continued)

*Primary Examiner* — David C. Payne
*Assistant Examiner* — Bahman Badipour
(74) *Attorney, Agent, or Firm* — Capitol City TechLaw

(57) ABSTRACT

Methods for compensation of imbalance between I (In-phase) and Q (Quadrature) signal paths (12a, 12b, 605a, 605b) in a quadrature receiver (8) and a quadrature transmitter (600) are disclosed. In the receiver case, the imbalance is compensated for by means of post-distortion in the digital domain. In the transmitter case, the imbalance is compensated for by means of pre-distortion in the digital domain. The methods can be carried out with a relatively low computational complexity. Signal-processing devices (30, 610) for carrying out the methods are disclosed as well. The same basic internal structure may be used for the signal-processing device (30) in the receiver case as for the signal processing device (610) in the transmitter case.

19 Claims, 8 Drawing Sheets

(56) References Cited

OTHER PUBLICATIONS

Anttila L et al: "Frequency-Selective I/O Mismatch Calibration of Wideband Direct-Conversion Transmitters" IEEE Transactions on Circuits and Systems II: Express Briefs, vol. 55, No. 4, Apr. 1, 2008, pp. 359-363.*

"Compensation of Frequency—Selective I/Q Imbalances in Wideband Receivers: Models and Algorithms", Mikko Valkama, Markh Renfors, and Visa Koivunen, IEEE 2001.*

Guanbin Xing et al., "Frequency Offset and I/Q Imbalance Compensation for Direct-Conversion Receivers", IEEE Transactions on Wireless Communications, vol. 4, No. 2, Mar. 2005, pp. 673-680.

Anttila L et al., "Circularity-Based I/Q Imbalance Compensation in Wideband Direct-Conversion Receivers", IEEE Transactions on Vehicular Technology, vol. 57, No. 4, Jul. 1, 2008, pp. 2099-2113.

Anttila L et al., "Gradient-Based Blind Iterative Techniques for I/Q Imbalance Compensation in Digital Radio Receivers", In Proceedings of Signal Processing Advances in Wireless Communications, Jun. 1, 2007, pp. 1-5.

Anttila L et al., "Blind Compensation of Frequency-Selective I/Q Imbalances in Quadrature Radio Receivers: Circularity-Based Approach", In Proceedings of the IEEE International Conference on Acoustics, Speech, and Signal Processing (ICASSP), vol. III, Apr. 15, 2007, pp. 245-248.

Anttila L et al., "Frequency-Selective I/Q Mismatch Calibration of Wideband Direct-Conversion Transmitters", IEEE Transactions on Circuits and Systems II: Express Briefs, vol. 55, No. 4, Apr. 1, 2008, pp. 359-363.

\* cited by examiner

METHODS AND APPARATUSES FOR COMPENSATION OF I/Q IMBALANCE

TECHNICAL FIELD

The present invention relates to methods and apparatuses for compensation of imbalance between I (In-phase) and Q (Quadrature) signal paths in a quadrature receiver and a quadrature transmitter.

BACKGROUND

Mismatch, or imbalance, between an in-phase (I) and a quadrature (Q) signal path in a quadrature receiver circuit limits the achievable image attenuation, which results in a distorted signal. Likewise, imbalance between an I and a Q signal path in a quadrature transmitter circuit also poses a limitation on the achievable image attenuation.

Various techniques have been developed for compensation of such imbalance in order to mitigate the effects of the imbalance and provide improved image attenuation. For example, the article L. Antilla et al, "Circularity-based I/Q imbalance compensation in wideband direct-conversion receivers", *IEEE Transactions on Vehicular Technology*, vol. 57, no. 4, pp. 2099-2113, July 2008, discloses compensation of I/Q imbalance in quadrature receivers. In the following, this article is referred to as the Antilla receiver paper. Furthermore, the article L. Antilla et al, "Frequency-selective I/Q mismatch calibration of wideband direct-conversion transmitters", *IEEE Transactions on Circuits and Systems—II: Express Briefs*, vol. 55, no. 4, pp. 359-363, April 2008, discloses compensation of I/Q imbalance in quadrature transmitters. In the following, this article is referred to as the Antilla transmitter paper FIG. 1 illustrates a block diagram of a basic compensation circuit 1 utilized in both of the articles mentioned above. A complex-valued signal $o_1(n)$ is an input signal to the compensation circuit 1 and another complex-valued signal $o_2(n)$ is output from the compensation circuit 1. In the case of a receiver circuit, $o_1(n)$ is a signal, representing received data, having unbalanced I and Q components that is processed by the compensation circuit 1 to generate the signal $o_2(n)$ with (ideally) restored balance between the I and Q components. In the case of a transmitter circuit, $o_1(n)$ is a signal, representing data to be transmitted, having balanced I and Q components, which is processed by the compensation circuit 1 to generate the signal $o_2(n)$ with imbalance between the I and Q components that compensates for the imbalance in the I and Q signal paths of the transmitter such that the transmitted radio-frequency (RF) signal (ideally) has balanced I and Q components. In either case, the signal $o_1(n)$ is input to a block 2 that generates the complex conjugate $o^*_1(n)$ of $o_1(n)$, which is filtered by a filter 3 having the frequency response $W(e^{j\omega})$. The output signal of the filter 3 is added to the signal $o_1(n)$ in the adder unit 4 to generate the signal $o_2(n)$.

It is desirable to provide efficient compensation of imbalance between I and Q signal paths of a quadrature receiver or a quadrature transmitter at a relatively low computational complexity, e.g. in order provide a relatively small overhead in terms of required circuit area and/or power consumption for performing the compensation.

SUMMARY

An object of the present invention is to provide means for compensation of imbalance between an in-phase (I) and a quadrature (Q) signal path of a quadrature receiver with a relatively low computational complexity. Another object of the present invention is to provide means for compensation of imbalance between an I and a Q signal path of a quadrature transmitter with a relatively low computational complexity.

According to a first aspect, there is provided a method for compensating an imbalance between an I and a Q signal path of a quadrature receiver adapted to generate a real-valued uncompensated digital I component $a(n)$ and a real-valued uncompensated digital Q component $b(n)$, together forming an uncompensated complex digital signal $x(n)=a(n)+jb(n)$, wherein j denotes the imaginary unit and n is a sequence index. The method comprises generating a complex compensation signal by filtering one of $a(n)$ and $jb(n)$ with a compensation filter having a complex-valued impulse response. Furthermore, the method comprises generating a first compensated complex digital signal as the sum of $x(n)$ and the complex compensation signal.

The method may further comprise adaptively generating filter parameters of the compensation filter.

The impulse response of the compensation filter may be on the form:
$h_A(n)+j\phi\delta(n)+j\phi h_A(n)+(e^{j\Phi}-1-j\phi)\cdot(\delta(n)+h_A(n))$, wherein $\delta(n)$ is the unit pulse, $\phi$ is a real-valued parameter and $h_A(n)$ is a real-valued sequence. Adaptively generating filter parameters of the compensation filter may comprise adaptively generating the real-valued parameter $\phi$ and the real-valued sequence $h_A(n)$.

Adaptively generating filter parameters of the compensation filter may comprise, for each of a number of iterations, where each iteration is identified by an iteration index i, generating filter parameters for attaining an impulse response $f^{(i)}(n)$, wherein $f^{(i)}(n)$ is a default impulse response for the first iteration, wherein i=1, and $f^{(i)}(n)$ is based on $f^{(i-1)}(n)$ and $\Delta^{(i-1)}(n)$ for i>1, and $\Delta^{(i-1)}(n)$ is an estimated impulse-response error of a preceding iteration. Furthermore, for each iteration, adaptively generating said filter parameters may comprise generating the complex compensation signal, denoted $e^{(i)}(n)$, as $e^{(i)}(n)=f^{(i)}(n)*w(n)$, wherein * denotes the convolution operator and $w(n)$ denotes said one of $a(n)$ and $jb(n)$. Moreover, for each iteration, adaptively generating said filter parameters may comprise generating the first compensated complex digital signal, denoted $v^{(i)}(n)$, as $v^{(i)}(n)=x(n)+e^{(i)}(n)$. In addition, for each iteration, adaptively generating said filter parameters may comprise generating filter parameters determining $\Delta^{(i)}(n)$ by minimizing a cost function based on $u^{(i)}(n)=v^{(i)}(n)+\Delta^{(i)}(n)*w(n)$.

Said cost function may e.g. a linear cost function. Furthermore, said cost function may be based on a properness measure of $u^{(i)}(n)$.

Each iteration may further comprise generating a second compensated complex digital signal $y^{(i)}(n)=v^{(i)}(n)+\Delta^{(i)}(n)*w(n)$ based on the generated $\Delta^{(i)}(n)$.

The method may further comprise determining whether a condition for ending said iterations is fulfilled. Moreover, the method may comprise, if said condition is fulfilled, ending said iterations and continuing compensating said imbalance between the I and the Q signal path based on filter parameters generated in the last iteration.

The impulse response $f^{(i)}(n)$ may be on the form:
$f^{(i)}(n)=h_A^{(i)}(n)+j\phi^{(i)}\delta(n)+j\phi^{(i)}h_A^{(i)}(n)+(e^{j\Phi^{(i)}}-1-j\phi^{(i)})\cdot(\delta(n)+h_A^{(i)}(n))$, wherein $\delta(n)$ is the unit pulse, $\phi^{(i)}$ is a real-valued parameter and $h_A^{(i)}(n)$ is a real-valued sequence.

Furthermore, $\Delta^{(i)}(n)$ may be on the form: $\Delta^{(i)}(n)=\Delta_h^{(i)}(n)+j\Delta_\phi^{(i)}$ for n belonging to a finite set of integers and $\Delta^{(i)}(n)=0$ outside said finite set of integers, wherein $\Delta_\phi^{(i)}$ is a real-valued parameter and $\Delta_h^{(i)}(n)$ is a real-valued sequence.

Generating filter parameters determining $\Delta^{(i)}(n)$ may comprise generating the real-valued parameter $\Delta_\phi^{(i)}$ and the real-valued sequence $\Delta_h^{(i)}(n)$.

Generating filter parameters for attaining the impulse response $f^{(i)}(n)$ may comprise generating the real-valued sequence $h_A^{(i)}(n)$ as $h_A^{(i)}(n)=h_A^{(i-1)}(n)+\Delta_h^{(i-1)}(n)$ and the real-valued parameter $\phi^{(i)}$ as $\phi^{(i)}=\phi^{(i-1)}+\Delta_\phi^{(i-1)}$ for i>1.

According to a second aspect, there is provided a method for compensating an imbalance between an I and a Q signal path of a quadrature receiver adapted to generate a real-valued uncompensated digital I component a(n) and a real-valued uncompensated digital Q component b(n), together forming an uncompensated complex digital signal x(n)=a(n)+jb(n), wherein j denotes the imaginary unit and n is a sequence index. The method comprises for each of a number of iterations, where each iteration is identified by an iteration index i, generating sample values of a finite-length real-valued impulse response $g_\Delta^{(i)}(n)$ that can adopt nonzero values for n in a finite set K, wherein $g_\Delta^{(i)}(n)$ is a default impulse response for the first iteration, wherein i=1, and $g_\Delta^{(i)}(n)$ is given by $g_\Delta^{(i)}(n)=g_\Delta^{(i-1)}(n)+\Delta_g^{(i-1)}(n)$ for i>1, and $\Delta_g^{(i-1)}(n)$ is an estimated impulse-response error of a preceding iteration. Furthermore, for each iteration, the method comprises generating a real-valued phase parameter $\phi^{(i)}$ as a default value for the first iteration, where i=1, and as $\phi^{(i)}=\phi^{(i-1)}+\Delta_\phi^{(i-1)}$ for i>1, wherein $\Delta_\phi^{(i-1)}$ is an estimated phase-parameter error of the preceding iteration. Moreover, for each iteration, the method comprises generating a first compensated complex digital signal, denoted $v^{(i)}(n)$, as $$v^{(i)}(n) = x(n) + \tan(\varphi^{(i)})w_1(n) + \left(\left(\frac{g_\Delta^{(i)}(n) + \delta(n)}{\cos(\varphi^{(i)})}\right) - \delta(n)\right) * w_2(n),$$

wherein * denotes the convolution operator, and either $w_1(n)=ja(n)$ and $w_2(n)=jb(n)$ or $w_1(n)=b(n)$ and $w_2(n)=a(n)$. In addition, for each iteration, the method comprises generating the estimated impulse response error $\Delta_g^{(i)}(n)$ and the estimated phase-parameter error $\Delta_\phi^{(i)}$ by minimizing a cost function based on $$u^{(i)}(n) = v^{(i)}(n) + \sum_{k \in K} (\Delta_g^{(i)}(k)w_2(n-k) + \Delta_\varphi^{(i)}w_1(n-k)).$$

Said cost function may be a linear cost function. Furthermore, said cost function may be based on a properness measure of $u^{(i)}(n)$.

Each iteration may further comprise generating a second compensated complex digital signal $$y^{(i)}(n) = v^{(i)}(n) + \sum_{k \in K} (\Delta_g^{(i)}(k)w_2(n-k) + \Delta_\varphi^{(i)}w_1(n-k))$$

based on the generated $\Delta_g^{(i)}(n)$ and $\Delta_\phi^{(i)}$.

The method may further comprise determining whether a condition for ending said iterations is fulfilled. Furthermore, the method may comprise, if said condition is fulfilled, ending said iterations and continuing compensating said imbalance between the I and the Q signal path based on filter parameters generated in the last iteration.

According to a third aspect, there is provided a signal-processing device for compensating an imbalance between an I and a Q, signal path of a quadrature receiver, wherein the quadrature receiver is adapted to generate a real-valued uncompensated digital I component a(n) and a real-valued uncompensated digital Q component b(n), together forming an uncompensated complex digital signal x(n)=a(n)+jb(n), wherein j denotes the imaginary unit and n is a sequence index, wherein the signal-processing device (30) is adapted to receive the uncompensated digital signal x(n) and compensate said imbalance by performing the method according to the first or the second aspect.

According to a fourth aspect, there is provided a quadrature receiver. The quadrature receiver comprises an I and a Q signal path for generating a real-valued uncompensated digital I component a(n) and a real-valued uncompensated digital Q component b(n), together forming an uncompensated complex digital signal x(n)=a(n)+jb(n), wherein j denotes the imaginary unit and n is a sequence index. Furthermore, the quadrature receiver comprises a signal-processing device according to the third aspect for compensating an imbalance between the I and the Q signal path.

According to a fifth aspect, there is provided a method for compensating an imbalance between an I and a Q signal path of a quadrature transmitter arranged to transmit a radio-frequency signal $r_a(t)$ representing an uncompensated complex-valued digital signal z(n)=c(n)+jd(n), wherein j denotes the imaginary unit, n is a sequence index, c(n) is an uncompensated digital I component, and d(n) is an uncompensated digital Q component, by generating a compensated complex-valued digital signal having a compensated digital I component, which is provided to the I signal path and a compensated digital Q component, which is provided to the Q signal path. The method comprises generating a complex compensation signal by filtering one of c(n) and jd(n) with a compensation filter having a complex-valued impulse response. Furthermore, the method comprises generating a first compensated complex digital signal as the sum of z(n) and the complex compensation signal.

The method may further comprise adaptively generating filter parameters of the compensation filter.

The impulse response of the compensation filter may be on the form:
$h_A(n)+j\phi\delta(n)+j\phi h_A(n)+(e^{j\Phi}-1-j\phi)\cdot(\delta(n)+h_A(n))$, wherein $\delta(n)$ is the unit pulse, $\phi$ is a real-valued parameter and $h_A(n)$ is a real-valued sequence. Adaptively generating filter parameters of the compensation filter may comprise adaptively generating the real-valued parameter $\phi$ and the real-valued sequence $h_A(n)$.

Adaptively generating filter parameters of the compensation filter may comprise, for each of a number of iterations, where each iteration is identified by an iteration index i, generating filter parameters for attaining an impulse response $f^{(i)}(n)$, wherein $f^{(i)}(n)$ is a default impulse response for the first iteration, wherein i=1, and $f^{(i)}(n)$ is based on $f^{(i-1)}(n)$ and $\Delta^{(i-1)}(n)$ for i>1, and $\Delta^{(i-10)}(n)$ is an estimated impulse-response error of a preceding iteration. Furthermore, for each iteration, adaptively generating said filter parameters may comprise generating the complex compensation signal, denoted $e^{(i)}(n)$, as $e^{(i)}(n)=f^{(i)}(n)*w(n)$, wherein * denotes the convolution operator and w(n) denotes said one of c(n) and jd(n). Moreover, for each iteration, adaptively generating said filter parameters may comprise generating the first compensated complex digital signal, denoted $v^{(i)}(n)$, as $v^{(i)}(n)=x(n)+e^{(i)}(n)$. In addition, for each iteration, adaptively generating said filter parameters may comprise generating filter parameters determining $\Delta^{(i)}(n)$ by minimizing a cost function based on a real-valued signal $r_{BB}(n)$, which is obtained from real downconversion of the signal $r_a(t)$.

Said cost function may be a linear cost function. Furthermore, the method may comprise generating a signal $q_{BB}(n)$ corresponding to a signal that would have resulted from real downconversion of a radio-frequency signal generated by inputting the signal $z(t)$ to a quadrature transmitter having no imbalance between the I and Q signal paths. The cost function may be based on a difference between $r_{BB}(n)$ and $q_{BB}(n)$. For example, the cost function is based on an $L^2$ norn or $L^\infty$ norm of said difference.

Each iteration may further comprise generating a second compensated complex digital signal $y^{(i)}(n)=v^{(i)}(n)+\Delta^{(i)}(n)*w(n)$ based on the generated $\Delta^{(i)}(n)$.

The method may comprise determining whether a condition for ending said iterations is fulfilled. Furthermore, the method may comprise, if said condition is fulfilled, ending said iterations and continuing compensating said imbalance between the I and the Q signal path based on filter parameters generated in the last iteration.

The impulse response $f^{(i)}(n)$ may be on the form: $f^{(i)}(n)=h_A^{(i)}(n)+j\phi^{(k)}\delta(n)+j\phi^{(i)}h_A^{(i)}(n)+(e^{j\phi^{(i)}}-1-j\phi^{(i)})\cdot(\delta(n)+h_A^{(i)}(n))$, wherein $\delta(n)$ is the unit pulse, $\phi^{(i)}$ is a real-valued parameter $h_A^{(i)}(n)$ is a real-valued sequence.

Furthermore, $\Delta^{(i)}(n)$ may be on the form: $\Delta^{(i)}(n)=\Delta_h^{(i)}(n)+j\Delta_\phi^{(i)}$ for n belonging to a finite set of integers and $\Delta^{(i)}(n)=0$ outside said finite set of integers, wherein $\Delta_\phi^{(i)}$ is a real-valued parameter and $\Delta_h^{(i)}(n)$ is a real-valued sequence. Generating filter parameters determining $\Delta^{(i)}(n)$ may comprise generating the real-valued parameter $\Delta_\phi^{(i)}$ and the real-valued sequence $\Delta_h^{(i)}(n)$.

Generating filter parameters for attaining the impulse response $f^{(i)}(n)$ may comprise generating the real-valued sequence $h_A^{(i)}(n)$ as $h_A^{(i)}(n)=h_A^{(i-1)}(n)+\Delta_h^{(i-1)}(n)$ and the real-valued parameter $\phi^{(i)}$ as $\phi^{(i)}=\phi^{(i-1)}+\Delta_\phi^{(i-1)}$ for $i>1$.

According to a sixth aspect, there is provided a signal-processing device for compensating an imbalance between an I and a Q signal path of a quadrature transmitter for transmitting a radio-frequency signal $r_a(t)$ representing an uncompensated complex-valued digital signal $z(n)=c(n)+jd(n)$, wherein j denotes the imaginary unit, n is a sequence index, c(n) is an uncompensated digital I component, and d(n) is an uncompensated digital Q component. The signal processing device is adapted to receive the uncompensated complex-valued digital signal z(n) and generate a compensated digital I component, to be provided to the I signal path and a compensated digital Q component, to be provided to the Q signal path by performing the method according to the fifth aspect for compensating said imbalance.

According to a seventh aspect, there is provided a quadrature transmitter for transmitting a radio-frequency signal $r_a(t)$ representing an uncompensated complex-valued digital signal $z(n)=c(n)+jd(n)$. The quadrature transmitter comprises an I and a Q signal path arranged to receive a compensated digital I component and a compensated digital Q component, respectively, for generating the radio-frequency signal $r_a(t)$. Moreover, the quadrature transmitter comprises a signal-processing device according to the sixth aspect for compensating an imbalance between the I and the Q signal path.

According to an eighth aspect, there is provided an electronic apparatus comprising the quadrature receiver according to the fourth aspect and/or the quadrature transmitter according to the seventh aspect. The electronic apparatus may e.g. be, but is not limited to, a mobile communication terminal or a radio base station.

According to a ninth aspect, there is provided a computer program product comprising computer program code means for executing the method according to the first, second, or fifth aspect when said computer program code means are run by an electronic device having computer capabilities.

According to a tenth aspect, there is provided a computer readable medium having stored thereon a computer program product comprising computer program code means for executing the method according to the first, second, or fifth aspect when said computer program code means are run by an electronic device having computer capabilities.

According to an eleventh aspect, there is provided a hardware-description entity comprising computer-interpretable hardware-description code describing the signal-processing device according to the third or the sixth aspect and enabling computer-aided fabrication thereof as an application-specific hardware unit, through configuration of a configurable hardware unit, or a combination thereof.

It is an advantage of embodiments of the present invention that imbalance between an I and a Q signal path of a quadrature receiver or transmitter can be compensated at a relatively low overhead in terms of required computational resources. This, in turn, means that the required circuit area and/or power consumption for performing the compensation can be kept relatively low.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 2:
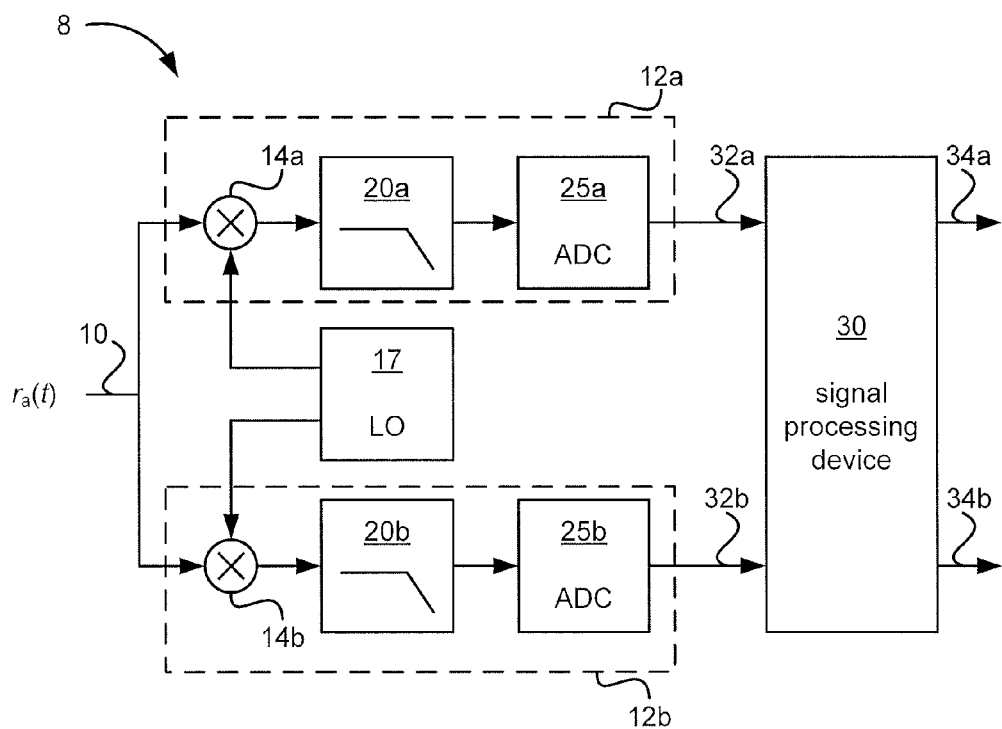
FIG. 2 is a block diagram of a quadrature receiver according to an embodiment of the present invention.

FIG. 2 is a block diagram of a quadrature receiver 8 according to an embodiment of the present invention. The quadrature receiver 8 is adapted to receive a continuous-time analog radio-frequency (RF) signal $r_a(t)$ on an input port 10. In the following, the subscript "a" is used together with signals and impulse responses to indicate that the signal/impulse response is an analog continuous-time signal/impulse response, t is used as a time variable indicating continuous time, and n is used as a sequence index indicating discrete time. Furthermore, reference is made in the following to discrete-time signals/impulse responses that corresponds to continuous-time signals/impulse responses and vice versa. The term "corresponds" should in these contexts be interpreted as follows in this specification. In the case of a discrete-time signal s(n) that corresponds to a continuous-time signal $s_a(t)$, $s(n)=s_a(nT)$, where T is the sample period. It is assumed that the signal $s_a(t)$ is properly bandlimited to allow sampling without (significant) aliasing in accordance with the Nyquist sampling theorem. That is, it is assumed that the signal $s_a(t)$ has no (or in practice, only negligible) spectral content at frequencies above a frequency $f_{BW}<1/(2T)$. In the case of a discrete-time impulse response g(n) that corresponds to a continuous-time impulse response $g_a(t)$, the discrete-time Fourier transform $G(e^{j\omega T})$ of g(n), defined by $$G(e^{j\omega T}) = \sum_{n=-\infty}^{\infty} g(n)e^{-j\omega nT},$$

is equal to the continuous-time Fourier transform $G_a(j\omega)$ of $g_a(t)$, defined by $$G_a(j\omega) = \int_{-\infty}^{\infty} g_a(t)e^{-j\omega t} dt$$

for a relevant angular frequency band, such as $0 \leq \omega < \pi/T$ or a subset thereof.

According to the embodiment illustrated in FIG. 2, the quadrature receiver 8 comprises an in-phase (I) signal path 12a and a quadrature (Q) signal path 12b. The I signal path 12a comprises a mixer 14a, and the Q signal path 12b comprises a mixer 14b. Both mixers 14a and 14b are adapted to receive the RF signal $r_a(t)$ on an input port. Furthermore, the quadrature receiver comprises a local oscillator (LO) unit 17, which is adapted to generate LO signals to the mixers 14a and 14b. Ideally, the LO signals supplied to the mixers 14a and 14b are provided in quadrature, i.e., ideally, there is a 90° (or π/2 radians) mutual phase shift between the LO signals. The mixers 14a and 14b are arranged to perform frequency down conversion of a signal frequency band of interest of the RF signal $r_a(t)$ to a lower frequency range. In the following, the quadrature receiver 8 is assumed to be a direct conversion receiver, which is adapted to down convert said frequency band to a base band, i.e. to a frequency band around 0 Hz. In other words, the LO frequency $f_0$ is a frequency band within said frequency band of interest. However, embodiments of the present invention is applicable to quadrature receivers that are adapted to down convert the signal frequency band of interest to other frequency bands as well.

According to the embodiment illustrated in FIG. 2, the quadrature receiver 8 further comprises a filter 20a and a filter 20b in the I signal path 12a and the Q signal path 12b, respectively. The filters 20a and 20b are arranged to suppress unwanted frequency components output from the mixers 14a and 14b. In FIG. 2, the filters 20a and 20b are illustrated as low-pass (LP) filters. However, in other embodiments, where the quadrature receiver 8 is not a direct conversion receiver, the filters 20a and 20b may instead be band-pass (BP) filters.

Moreover, in the embodiment illustrated in FIG. 2, the quadrature receiver 8 comprises an analog-to-digital converter (ADC) 25a and an ADC 25b in the I signal path 12a and the Q signal path 12b, respectively. The ADC 25a is adapted to convert the output signal from the filter 20a to a digital representation for generating a real-valued uncompensated digital I component, in the following denoted a(n). Similarly, the ADC 25b is adapted to convert the output signal from the filter 20b to a digital representation for generating a real-valued uncompensated digital Q component, in the following denoted b(n). The real-valued signals a(n) and b(n) together form an uncompensated complex digital signal x(n)=a(n)+jb(n), wherein j denotes the imaginary unit.

A problem with frequency down conversion using mixers is that a frequency component of the input signal to the mixer located at a frequency $f_0+f_1$ and another frequency component of the input signal to the mixer located at a frequency $f_0-f_1$ are mapped onto the same frequency $f_1$ in the output signal from the mixer. By means of a quadrature receiver configuration, wherein a complex-valued signal representation is used, it is possible to suppress one of the components (normally referred to as the image component), say the one at $f_0-f_1$, and essentially maintain only the desired component, say the one at $f_0+f_1$. This is normally referred to as image rejection or image attenuation. In order to have a high degree of image attenuation, the I and Q signal paths need to be well balanced, i.e. the mutual phase difference between the LO signals of the I and Q signal paths needs to be close to 90° and the transfer functions of the I and Q signal paths need to be approximately equal. A mismatch, or imbalance, between the I and the Q signal path limits the achievable image attenuation. Such imbalance is normally due to temperature variations, manufacturing inaccuracies, and other non-idealities of the physical components in the I and Q signal paths of the quadrature receiver. Without use of compensation techniques, the achievable image attenuation is normally around 30-50 dB. Considering that the image component in some situations may well be 50-100 dB stronger than the desired component, such image attenuation may be insufficient.

To compensate for the problems with insufficient image attenuation, the quadrature receiver 8 in the embodiment illustrated in FIG. 2 comprises a signal-processing device 30, which is adapted to compensate for imbalance between the I signal path 12a and the Q signal path 12b of the quadrature receiver 8. The signal-processing device 30 is adapted to receive the uncompensated digital signal x(n) and compensate said imbalance by performing a signal processing method, which is further described below in the context of various embodiments. Thereby, the resulting overall I/Q imbalance of the quadrature receiver 8 can be reduced compared with if the signal-processing device 30 had not been present.

In the embodiment illustrated in FIG. 2, the signal-processing device 30 is adapted to receive the signal a(n) on an input port 32a and the signal b(n) on an input port 32d. Furthermore, the signal-processing device 30 is adapted to output a compensated digital I component on an output port 34a and a compensated digital Q component on an output port 34b. In the embodiment illustrated in FIG. 2, the signals a(n) and b(n) are the output signals from the ADCs 25a and 25b. However, in other embodiments, one or more intervening components (not shown) for generating the signals a(n) and b(n) based on the output signals from the ADCs 25a and 25b may be connected between the ADCs 25a and 25b and the signal-processing device 30. Nonlimiting examples of such intervening components may e.g. be filters or components for performing sample-rate conversion, such as interpolation or decimation.

Figure 3:
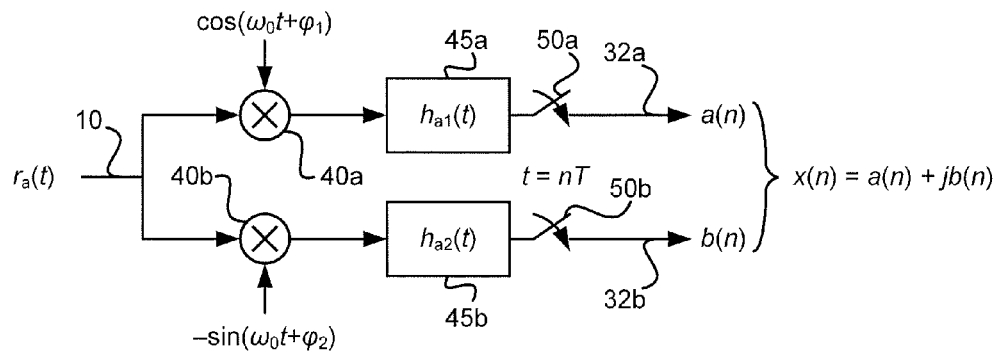
FIG. 3 is a block diagram of a model of a quadrature receiver circuit.

FIG. 3 is a block diagram of a model of the quadrature receiver 8 in FIG. 2, but without the signal-processing device 30. The mixers 14a and 14b, and the LO 17 (FIG. 2) are modeled with the multipliers 40a and 40b multiplying the signal $r_a(t)$ by $\cos(\omega_0 t+\phi_1)$ and $-\sin(\omega_0 t+\phi_2)$, respectively, where $\omega_0$ is $2\pi f_0$. With balanced I and Q signal path, $\phi_1=\phi_2$. A difference between $\phi_1$ and $\phi_2$ results in an imbalance between the I and Q signal paths.

The filters 20a and 20b (FIG. 2) are modeled with the blocks 45a and 45b, respectively, having impulse responses $h_{a1}(t)$ and $h_{a2}(t)$, as indicated in FIG. 3. Furthermore, the ADCs 25a and 25b are modeled with ideal sample switches 50a and 50b, respectively, arranged to sample the output signals from the blocks 45a and 45b at time instants t=nT, where T denotes the sample period, as illustrated in FIG. 3. Any gain mismatch between and (linear) dynamic behavior of the ADCs 25a and 25b are lumped into the blocks 45a and 45b in the model of FIG. 3.

An assumption used in derivations presented below is that the RF signal $r_a(t)$ is on the form $r_a(t)=z_a(t)e^{j\omega_0 t}+z^*_a(t)e^{-j\omega_0 t}$, where $z_a(t)$ is the corresponding analog representation of the discrete-time baseband signal $z(n)=z_a(nT)=c(n)+jd(n)$, which represents data transmitted by a transmitter, where $c(n)$ and $d(n)$ are both real-valued signals. A purpose of the quadrature receiver 8 is to enable recovery of said data. The signal $x(n)$ can then be written on the form $$x(n) = \tilde{g}_1(n) * z(n) + \tilde{g}_2(n) * z^*(n), \quad \text{(Eq. 1)}$$

where $$\tilde{g}_1(n) = \frac{e^{-j\varphi_1}h_1(n) + e^{-j\varphi_2}h_2(n)}{2}, \quad \text{(Eq. 2)}$$

and $$\tilde{g}_2(n) = \frac{e^{j\varphi_1}h_1(n) - e^{j\varphi_2}h_2(n)}{2}. \quad \text{(Eq. 3)}$$

Above, $h_1(n)$ and $h_2(n)$ are discrete-time impulse responses corresponding to continuous-time impulse responses $h_{a1}(t)$ and $h_{a2}(t)$.

An equivalent representation is given by $$x(n)=g_1(n)*p(n)\pm g_2(n)*p^*(n), \quad \text{(Eq. 4)}$$

where the sign $\pm$ represents either $+$ or $-$ in different cases. In a case referred to below as case 1, $\pm$ represents $+$, and in a case referred to below as case 2, $\pm$ represents $-$. In Eq. 4, $$g_1(n) = \frac{\delta(n) + e^{-j\phi}h(n)}{2} \quad \text{(Eq. 5)}$$

and $$g_2(n) = \frac{\delta(n) - e^{j\phi}h(n)}{2}. \quad \text{(Eq. 6)}$$

According to case 1:

$$p(n)=e^{-j\phi_1}h_1(n)*z(n), \quad \text{(Eq. 7)}$$

$$h(n)*h_1(n)=h_2(n), \quad \text{(Eq. 8)}$$

and $$\phi=\phi_2-\phi_1. \quad \text{(Eq. 9)}$$

According to case 2:

$$p(n)=e^{-j\phi_2}h_2(n)*z(n), \quad \text{(Eq. 10)}$$

$$h(n)*h_2(n)=h_1(n), \quad \text{(Eq. 11)}$$

and $$\phi=\phi_1-\phi_2. \quad \text{(Eq. 12)}$$

For both case 1 and case 2, the signal $p(n)$ is a linearly distorted version of $z(n)$, from which $z(n)$ can be recovered by means of a linear equalizer. Such a linear equalizer is normally included in a receiver. Hence, the signal-processing device 30 can be adapted to recover $p(n)$ instead of $z(n)$, which can instead be recovered from $p(n)$ by means of said equalizer. The real and imaginary part of $p(n)$ are in the following denoted $\tilde{a}(n)$ and $\tilde{b}(n)$, respectively. Hence, $p(n)=\tilde{a}(n)+j\tilde{b}(n)$, where $\tilde{a}(n)$ and $\tilde{b}(n)$ are real-valued signals.

For case 1, we have:

$$x(n)=\tilde{a}(n)+j(\cos(\phi)h(n)*\tilde{b}(n)-\sin(\phi)h(n)*\tilde{a}(n)) \quad \text{(Eq. 13)}$$

Similarly, for case 2, we have:

$$x(n)=(\cos(\phi)h(n)*\tilde{a}(n)-\sin(\phi)h(n)*\tilde{b}(n))+j\tilde{b}(n) \quad \text{(Eq. 14)}.$$

It can be observed from Eq. 13 and Eq. 14 that the real and imaginary parts of $p(n)$ experience different transfer function, which results in image distortion in the signal $x(n)$. Furthermore, it can be observed that in case 1, $a(n)=\tilde{a}(n)$ (i.e. the real parts of $x(n)$ and $p(n)$ are equal), and in case 2, $b(n)=\tilde{b}(n)$ (i.e. the imaginary parts of $x(n)$ and $p(n)$ are equal). This is utilized below in the derivation of resource-efficient circuitry and methods for compensating the I/Q imbalance.

In FIGS. 4-7, referred to below, labels and reference signs included within square brackets relate to embodiments of a corresponding signal processing device for compensating I/Q imbalance in a quadrature transmitter.

Figure 4:
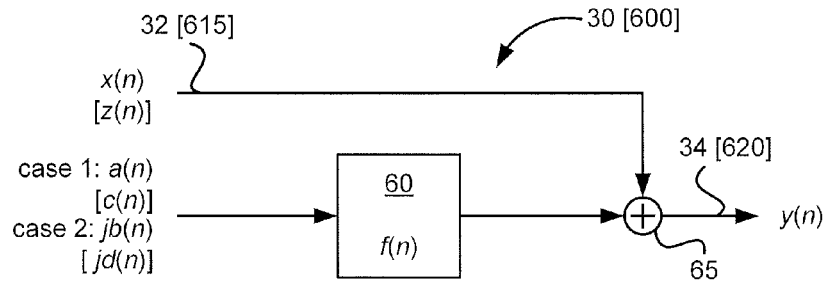
FIGS. 4-7 are block diagrams of a signal-processing device according to embodiments of the present invention.

FIG. 4 is a block diagram of the signal-processing device 30 according to an embodiment of the present invention. According to the embodiment, the signal-processing device 30 comprises a compensation filter 60. The compensation filter 60 is arranged to receive an input signal having only a real or an imaginary component, not both. Furthermore, the compensation filter 60 has a complex-valued impulse response, and is therefore arranged to output a complex-valued output signal (i.e. a signal having both a real and an imaginary component), which is a compensation signal for compensation of I/Q imbalance. In the embodiment of FIG. 4, the signal-processing device 30 has an input port 32 and an output port 34. The input port 32 is a compound input port representing both input ports 32a and 32b in FIG. 2. Similarly, the output port 34 is a compound output port representing both output ports 34a and 34b in FIG. 2. Furthermore, according to the embodiment illustrated in FIG. 4, the signal-processing device 30 comprises an adder unit 65 adapted to generate a complex compensated digital signal $y(n)$ as the sum of $x(n)$ and the output signal of the compensation filter 60. The signal $y(n)$ is output on the output port 34. With reference to FIG. 2, the real part of $y(n)$ (or compensated digital I component) is output on the output port 34a, and the imaginary part of $y(n)$ (or compensated digital Q component) is output on the output port 34b.

For case 1, the compensation filter 60 is arranged to receive the real part $a(n)$ of $x(n)$ as an input signal. For case 2, the compensation filter 60 is arranged to receive the imaginary part $b(n)$ of $x(n)$, multiplied by j, as an input signal. Hence, although such a connection is not explicitly shown in FIG. 4, the compensation filter 60 may be operatively connected to the input port 32 for receiving its input signal. For case 1, the selection of $f(n)$ as $$f(n)=e^{j\phi}h(n)-\delta(n) \quad \text{(Eq. 15)}$$

results in $$y(n)=\cos(\phi)h(n)*p(n)=\cos(\phi_2-\phi_1)e^{-j\phi_1}h_2(n)*z(n) \quad \text{(Eq. 16)}.$$

Hence, y(n) is a linear function of z(n), from which z(n) can be recovered by means of a linear equalizer. Similarly, for case 2, the selection of f(n) as $$f(n)=e^{-j\phi}h(n)-\delta(n) \quad \text{(Eq. 17)}$$

results in $$y(n)=\cos(\phi)h(n)*p(n)=\cos(\phi_1-\phi_2)e^{-j\phi_2}h_1(n)*z(n) \quad \text{(Eq. 18)}.$$

Hence, also for case 2, y(n) is a linear function of z(n), from which z(n) can be recovered by means of a linear equalizer.

Figure 1:
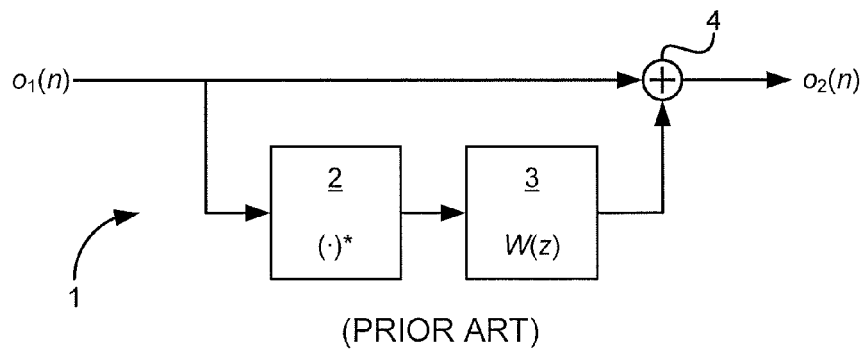
FIG. 1 is a block diagram of a known circuit for compensating I/Q imbalance.

It is an advantage of the embodiment illustrated in FIG. 4 that the same performance in terms of image rejection can be achieved as for the compensation circuit illustrated in FIG. 1 at a lower computational complexity, because only the real or imaginary part of x(n) is input to the compensation filter 60 in the embodiment of FIG. 4, whereas the filter 3 in the compensation circuit of FIG. 1 requires a complex-valued input signal. Hence, for a given performance in terms of image attenuation, the embodiment illustrated in FIG. 4 can be implemented using a smaller amount of computational resources than the compensation circuit of FIG. 1. This, in turn, can be utilized to implement the embodiment of FIG. 4 with a lower power consumption and/or smaller circuit area than the compensation circuit of FIG. 1.

In order to facilitate efficient compensation of I/Q imbalance, filter parameters of the compensation filter 60 may be generated and updated adaptively. The methods disclosed in the Antilla receiver paper referred to in the "Background" section can e.g. be utilized for this purpose. Further approaches for adaptively generating filter parameters of compensation filters are disclosed below in the context of certain embodiments.

Figure 5:
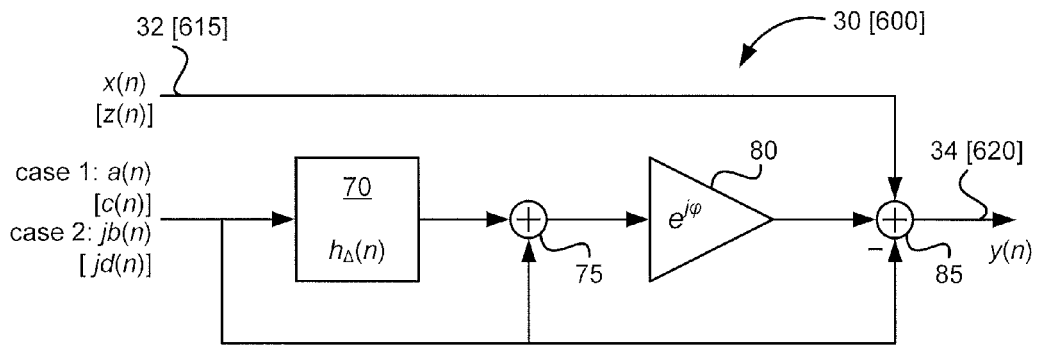

Further simplifications of the compensation filter 60 are possible, which allows for a further reduction of the required computational complexity, as is disclosed below. For case 1, f(n) can be rewritten as $$f(n)=h_A(n)+j\phi\delta(n)+j\phi h_A(n)+(e^{j\phi}-1-j\phi)\cdot(\delta(n)+h_A(n)) \quad \text{(Eq. 19)}$$

where $h_A(n)=h(n)-\delta(n)$. A block diagram of an embodiment of the signal-processing device 30 that utilizes the expression of Eq. 19 for obtaining a computational-efficient implementation is illustrated in FIG. 5. In this embodiment, the signal-processing device comprises a filter unit 70 adapted to receive the real-valued signal a(n) as an input signal. The filter unit 70 has the impulse response $h_A(n)$. Furthermore, the signal-processing device 30 comprises an adder unit 75 adapted to generate the sum of a(n) and the output signal of the filter unit 70. In addition, the signal-processing device 30 comprises a multiplication unit 80 adapted to multiply the sum generated by the adder unit 75 by the complex valued coefficient $e^{j\phi}$ and output the generated product. Moreover, the signal-processing device 30 comprises an adder unit 85 adapted to generate the sum of said product output from the multiplication unit 80 and -a(n). This sum corresponds to the complex-valued compensation signal output from the compensation filter 60 in the embodiment illustrated in FIG. 4. The adder circuit 85 is further adapted to add said sum and the signal x(n) to form the compensated digital signal y(n). In a comparison between FIGS. 4 and 5, the function of the compensation filter 60 (FIG. 4) is performed by the filter unit 70, multiplication unit 80, and the adder units 75 and 85 (FIG. 5), whereas the function of the adder unit 65 (FIG. 4) is performed by the adder unit 85 (FIG. 4).

The impulse responses f(n) and $h_A(n)$ have the same lengths. However, f(n) has complex-valued samples, whereas $h_A(n)$ has only real-valued samples. In the following, it is assumed that the lengths of f(n) and $h_A(n)$ are finite and equal to N (i.e. finite-length impulse response (FIR) filters are used for the compensation). If the compensation filter 60 in the embodiment of FIG. 4 is implemented as an FIR filter of length N with a "brute force" approach (e.g. as a standard or transposed direct form FIR filter), N multiplications with complex-valued coefficients are required for each sample, which corresponds to 2N multiplications with real-valued coefficients. With the same "brute force" approach used for implementing the filter unit 70 in FIG. 5, N multiplications with real-valued coefficients are required in the filter unit 70 for each sample. In addition, one multiplication with a complex-valued coefficient is required in the multiplication unit 80 for each sample, which corresponds to two multiplications with real-valued coefficients, resulting in a total of N+2 multiplications with real valued coefficients for each sample in the signal-processing device 30, which is approximately 50% of the number of multiplications for the case where the compensation filter 60 of FIG. 4 is implemented with a "brute force" approach. This can be utilized to further reduce the power consumption and/or the required circuit area. In addition, the adaptive generation of filter parameters is simplified, as only N real-valued filter coefficients for the filter unit 70 and the real-valued parameter φ need to be generated, compared with N complex-valued coefficients, corresponding to 2N real-valued coefficients, which are to be adaptively generated in the case where the compensation filter 60 of FIG. 4 is implemented with the "brute force" approach.

Comparing Eq. 15 and Eq. 17, it is readily realized that the structure of the signal-processing device 30 in FIG. 5 can be utilized also in case 2, replacing a(n) with jb(n). This is illustrated in FIG. 5 with the label "case 2: jb(n)". Although the parameter φ enters with different signs in Eq. 15 and Eq. 17, this difference can be compensated for in the generation of the filter parameters by generating φ with different signs in the two cases (corresponding to a variable substitution where -φ is replaced with φ in Eq. 17). Such compensation is taken care of automatically in an adaptive parameter-generation scheme.

Figure 6:
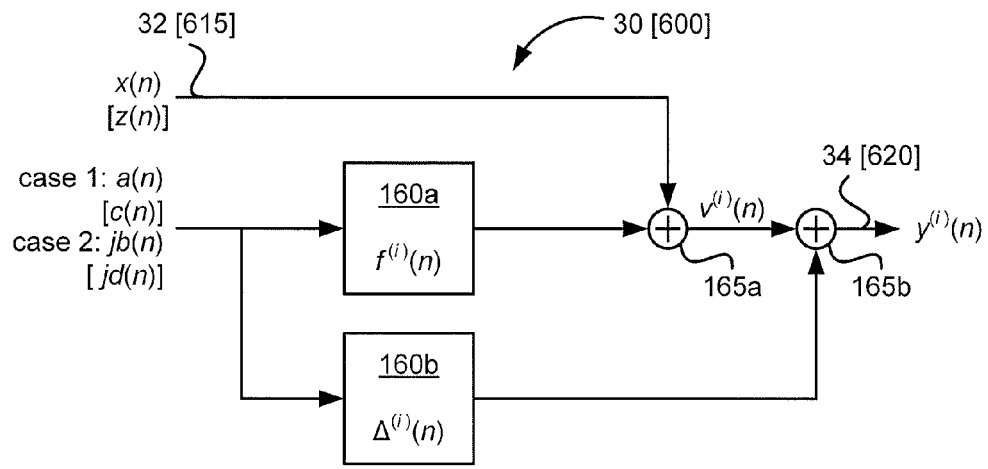

Adaptive generation of filter parameters in the signal-processing device 30 according to an embodiment of the present invention is described below with reference to FIG. 6. FIG. 6 is a block diagram of an embodiment of the signal-processing device 30. According to this embodiment, the signal-processing device 30 comprises a compensation filter 160a, which essentially corresponds to the compensation filter 60 of FIG. 4. The compensation filter 160a is arranged to receive an input signal having only a real or an imaginary component, not both. Furthermore, the compensation filter 160a has a complex-valued impulse response, and is therefore arranged to output a complex-valued output signal, which is a compensation signal for compensation of I/Q imbalance. Just as for the compensation filter 60 in FIG. 4, the compensation filter 160a is arranged to receive a(n) in case 1 and jb(n) in case 2, as is illustrated in FIG. 6.

Filter parameters of the filter unit 160a are adaptively generated in a number of iterations. Each iteration is below identified by an iteration index i. For the i:th iteration, filter parameters for attaining an impulse response $f^{(i)}(n)$ are generated. In the first iteration, $f^{(i)}(n)$ may be a default impulse response for the first iteration (i.e. for i=1). The default impulse response may e.g. be $f^{(1)}(n)=\delta(n)$. For the following iterations (i.e. for i>1), $f^{(i)}(n)$ is based on $f^{(i-1)}(n)$ and $\Delta^{(i-1)}(n)$, and $\Delta^{(i-1)}(n)$ is an estimated impulse-response error of a preceding iteration. How $f^{(i)}(n)$ can be based on $f^{(i-1)}(n)$ and $\Delta^{(i-1)}(n)$ is described in more detail in the context of specific embodiments below. Furthermore, the complex compensation signal, which is denoted $e^{(i)}(n)$ in the following, is generated on an output port of the compensation filter 160a as $e^{(i)}(n)=f^{(i)}(n)*w(n)$, wherein $w(n)$ denotes $a(n)$ in case 1 and $jb(n)$ in case 2. A first compensated complex digital signal, denoted $v^{(i)}(n)$, is generated as $v^{(i)}(n)=x(n)+e^{(i)}(n)$ in an adder unit 165a of the signal-processing device 30.

In addition, filter parameters determining the estimated impulse response error $\Delta^{(i)}(n)$ are generated, which can be used in the (i+1):th iteration for determining $f^{(i)}(n)$. For example, the filter parameters determining $\Delta^{(i)}(n)$ may be generated based on the expression $u^{(i)}(n)=v^{(i)}(n)+\Delta^{(i)}(n)*w(n)$, using an optimization technique aiming at making the I/Q imbalance of $u^{(i)}(n)$ lesser than that of $v^{(i)}(n)$. For example, the filter parameters determining $\Delta^{(i)}(n)$ may be generated by minimizing a cost function that is based on $u^{(i)}(n)$.

Assuming that the underlying signal $z(t)$ is proper, as it is defined in the Antilla receiver paper referred to above, i.e. that $$E[z(t)z(t-\tau)]=0 \text{ for all } \tau, \quad \text{(Eq. 20)}$$

where $E[\cdot]$ denotes the expectation value operator, the compensated signal output from the signal-processing device 30 should also be proper if the I/Q imbalance is perfectly compensated.

In such a case, the cost function based on $u^{(i)}(n)$ may be based on a properness measure of $u^{(i)}(n)$. Such a properness measure $P(\Delta^{(i)}(n), k)$ may e.g. be defined as $$P(\Delta^{(i)}(n), k) = \sum_{l \in L} u^{(i)}(l) u^{(i)}(l-k), \quad \text{(Eq. 21)}$$

where $L$ is a suitably chosen interval. The length of $L$ may e.g. be chosen based on computer simulations and/or measurements in order to obtain a desired accuracy for a given application. Furthermore, the cost function based on $P(\Delta^{(i)}(n), k)$ may e.g. be defined as $$C(\Delta^{(i)}(n)) = \sum_{k \in K} (\text{Re}(P(\Delta^{(i)}(n), k)))^2 + (\text{Im}(P(\Delta^{(i)}(n), k)))^2, \quad \text{(Eq. 22)}$$

where Re and Im denotes the real and imaginary parts, respectively, and $K$ is a suitably chosen interval. The length of $K$ may e.g. be chosen based on computer simulations and/or measurements in order to obtain a desired accuracy for a given application. As a general rule of thumb, the length of $K$ should typically be at least of the same order as the length of $\Delta^{(i)}(n)$.

The cost function $C(\Delta^{(i)}(n))$ can be seen as a function of the filter parameters determining $\Delta^{(i)}(n)$. In the following discussion, the number of filter parameters determining $\Delta^{(i)}(n)$ is denoted M. $C(\Delta^{(i)}(n))$, as defined by Eq. 22, is generally a nonlinear cost function of the filter parameters determining $\Delta^{(i)}(n)$ (depending, of course, on how $\Delta^{(i)}(n)$ depends on the filter parameters). Another cost function $\tilde{C}(\Delta^{(i)}(n))$ may be derived from the nonlinear cost function $C(\Delta^{(i)}(n))$ (defined by Eq. 22, or as a nonlinear cost function of the filter parameters in any other suitable way) by linearizing $C(\Delta^{(i)}(n))$ with respect to the filter parameters, e.g. around the point $\Delta^{(i)}(n)=0$ for all n. Thereby, a linear cost function $\tilde{C}(\Delta^{(i)}(n))$ in the M filter parameters is obtained. For example, a set of linear equations may be derived by linearizing $(\text{Re}(P(\Delta^{(i)}(n), k)))^2$ and $(\text{Im}(P(\Delta^{(i)}(n), k)))^2$, with respect to the M filter parameters, for each k∈K and setting the resulting linear equations equal to zero. Although the filter parameter values solving this linearized cost function does not exactly correspond to the minimum of $C(\Delta^{(i)}(n))$, the solution to the linearized cost function will normally, for each iteration, successively approach a solution, or region of solutions, close to the optimum solution. An advantage of this approach is that it requires less computational resources than directly minimizing the nonlinear cost function $C(\Delta^{(i)}(n))$.

As indicated in FIG. 6, the signal-processing device 30 may be further arranged to generate a second compensated complex digital signal $y^{(i)}(n)=v^{(i)}(n)+\Delta^{(i)}(n)*w(n)$ based on the generated filter parameters determining $\Delta^{(i)}(n)$ (wherein, again, $w(n)$ denotes $a(n)$ in case 1 and $jb(n)$ in case 2). For this purpose, the signal-processing device 30 may comprise a filter unit 160b, having the impulse response $\Delta^{(i)}(n)$, and an adder unit 165b as indicated in FIG. 6. This second compensated digital signal $y^{(i)}(n)$ may be the signal which is output on the output port 34. In other embodiments, the signal $v^{(i)}(n)$ may instead be output on the output port 34. In such embodiments, the filter unit 160b and the adder unit 165b may be omitted.

In an embodiment, the compensation filter 160a is an FIR filter, wherein the length of each of the impulse responses $f^{(i)}(n)$ and $\Delta^{(i)}(n)$ are N. Furthermore, the filter parameters for attaining the impulse response $f^{(i)}(n)$ are the N real parts and the N imaginary parts of the samples of $f^{(i)}(n)$. Similarly, the filter parameters determining $\Delta^{(i)}(n)$ are the N real parts and the N imaginary parts of the samples of $\Delta^{(i)}(n)$. Hence, in this embodiment, M=2N. Moreover, in this embodiment, $f^{(i)}(n)$ is generated based on $f^{(i-1)}(n)$ and $\Delta^{(i-1)}(n)$ as $f^{(i)}(n)=f^{(i-1)}(n)+\Delta^{(i-1)}(n)$.

Figure 7:
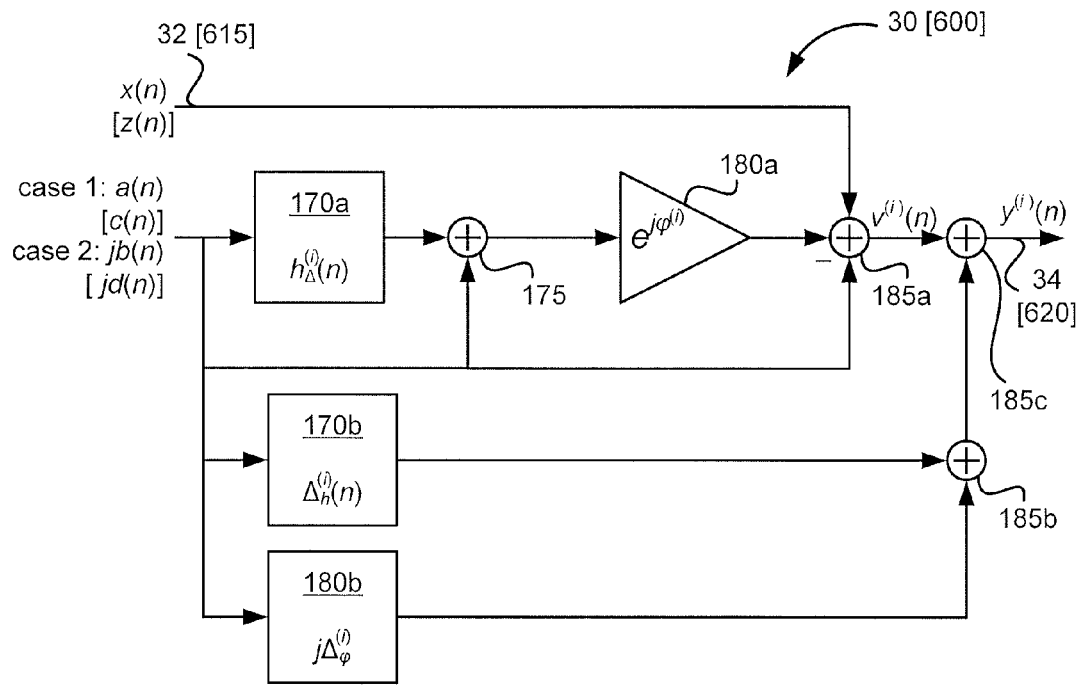

FIG. 7 is a block diagram of another embodiment of the signal-processing device 30, corresponding to the embodiment illustrated in FIG. 5, which also illustrates adaptive generation of filter parameters. In this embodiment, the impulse response $f^{(i)}(n)$ is on the form $$f^{(i)}(n) = h_\Delta^{(i)}(n) + j\phi^{(k)}\delta(n) + j\phi^{(i)} h_\Delta^{(i)}(n) + (e^{j\phi^{(i)}}-1-j\phi^{(i)}) \cdot (\delta(n) + h_\Delta^{(i)}(n)) \quad \text{(Eq. 23)}$$

where $\phi^{(i)}$ is a real-valued parameter and $h_\Delta^{(i)}(n)$ is a real-valued sequence. This form of $f^{(i)}(n)$ is motivated by Eq. 19.

In the embodiment illustrated in FIG. 7, the signal-processing device 30 comprises a filter unit 170a, which essentially corresponds to the filter unit 70 in FIG. 5. The filter unit 170a has the impulse response $h_\Delta^{(i)}(n)$. Furthermore, the signal-processing device 30 comprises an adder unit 175 adapted to generate the sum of $w(n)$ (which, as above, is used to denote $a(n)$ for case 1 and $jb(n)$ for case 2) and the output signal of the filter unit 170a. The adder unit 175 essentially corresponds to the adder unit 75 in FIG. 5. In addition, the signal-processing device 30 comprises a multiplication unit 180a adapted to multiply the sum generated by the adder unit 175 by the complex valued coefficient $e^{j\phi^{(i)}}$ and output the generated product. The multiplication unit 180a essentially corresponds to the multiplication unit 80 in FIG. 5. Moreover, the signal-processing device 30 comprises an adder unit 185a adapted to generate the sum of said product output from the multiplication unit 180a and $-w(n)$. The adder unit 185a essentially corresponds to the adder unit 85 in FIG. 5. The output signal of the adder unit 185a is a first compensated complex digital signal, denoted $v^{(i)}(n)$.

For the embodiment illustrated in FIG. 7, the adaptive generation of filter parameters may be performed in the same general way as described in the context of FIG. 6. The filter parameters determining $\Delta^{(i)}(n)$ may be a real-valued parameter $\Delta_\phi^{(i)}$ and a real-valued sequence $\Delta_h^{(i)}(n)$, having the same length as the real-valued sequence $h_\Delta^{(i)}(n)$. The filter parameters to be generated for attaining the impulse response $f^{(i)}(n)$ may be the real-valued sequence $h_\Delta^{(i)}(n)$, which can be generated as $$h_\Delta^{(i)}(n) = h_\Delta^{(i-1)}(n) + \Delta_h^{(i-1)}(n), \qquad (Eq.\ 24)$$

and the real-valued parameter $\phi^{(i)}$, which can be generated as $$\phi^{(i)} = \phi^{(i-1)} + \Delta_\phi^{(i-1)} \qquad (Eq.\ 25)$$

In the following, it embodiments where the filter unit 170a is an FIR filter is considered. Hence, the impulse response $h_\Delta^{(i)}(n)$ has finite length which is denoted N in conformity with the example above in connection with FIG. 6. The estimated impulse response error $\Delta^{(i)}(n)$ may be on the form $$\Delta^{(i)}(n) = \Delta_h^{(i)}(n) + j\Delta_\phi^{(i)} \qquad (Eq.\ 26)$$

for n belonging to a finite set of integers and $\Delta^{(i)}(n) = 0$ outside said finite set of integers. Said finite set of integers is the interval of length N for which $h_\Delta^{(i)}(n)$ can adopt nonzero values. The expression given by Eq. 26 is a first-order approximation of $f^{(i+1)}(n) - f^{(i)}(n)$ with $f^{(i)}(n)$ given by Eq. 23 and $\phi^{(i)}$ and $h_\Delta^{(i)}(n)$ given by Eq. 24 and Eq. 25, respectively. For this situation, the number M of filter parameters for attaining the impulse response $f^{(i)}(n)$ is N+1, namely the N real-valued samples of $h_\Delta^{(i)}(n)$ and the real-valued parameter $\phi^{(i)}$. For N>1, this is less than for the example presented above with reference to FIG. 6, wherein M=2N, whereby adaptive generation of filter parameters can be performed using less computational resources, which is an advantage.

As indicated in FIG. 7, the signal-processing device 30 may be further arranged to generate a second compensated complex digital signal $y^{(i)}(n) = v^{(i)}(n) + \Delta^{(i)}(n) * w(n)$ based on the generated filter parameters determining $\Delta^{(i)}(n)$. For this purpose, the signal-processing device 30 may comprise a filter unit 170b, having an impulse response equal to the real part of Eq 26, a filter unit 180b having an impulse response equal to j multiplied by the imaginary part of Eq. 26, and adder units 185b and 185c as indicated in FIG. 7. As for the embodiment illustrated in FIG. 6, this second compensated digital signal $y^{(i)}(n)$ may be the signal which is output on the output port 34. In other embodiments, the signal $v^{(i)}(n)$ may instead be output on the output port 34. In such embodiments, the filter units 170b and 180b and the adder units 185b and 185c may be omitted.

In a comparison between the block diagrams in FIG. 7 and the more general block diagram of FIG. 6, the function of the compensation filter 160a (FIG. 6) is performed by the filter unit 170a, the multiplication unit 180a, and the adder units 175 and 185a (FIG. 7). Furthermore, the function of the adder unit 165a (FIG. 6) is performed by the adder unit 185a (FIG. 7). Moreover, the function of the filter unit 160b (FIG. 6) is performed by the filter units 170b and 180b and the adder unit 185b (FIG. 7), and the function of the adder unit 165b (FIG. 6) is performed by the adder unit 185c.

Figure 8:
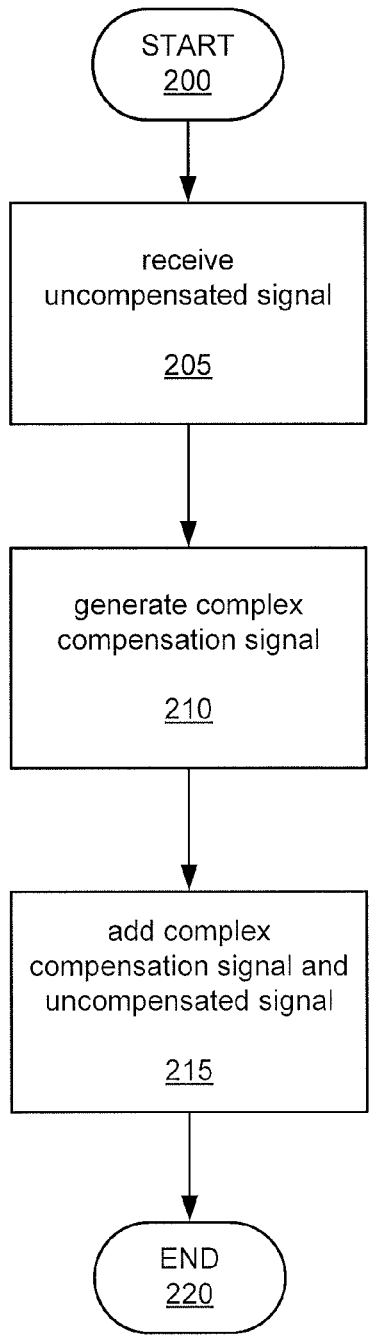
FIGS. 8-10 are flow charts for methods according to embodiments of the present invention.

FIG. 8 is a flow chart of a method for compensating an imbalance between the I signal path 12a and the Q signal path 12b of the quadrature receiver 8 (FIG. 2) according to an embodiment of the present invention. The method may e.g. be performed by the signal-processing device 30 (FIGS. 2-7). According to the embodiment, the method is started in step 200. In step 205, the uncompensated complex digital signal $x(n) = a(n) + jb(n)$ is received, e.g. on the input port 32 (FIGS. 3-7) or ports 32a and 32b (FIG. 2) of the signal-processing device 30. In step 210, the complex compensation signal is generated by filtering one of $a(n)$ (case 1) and $jb(n)$ (case 2) with a compensation filter having a complex-valued impulse response. Step 210 may e.g. be performed by the compensation filter 60 (FIG. 4), the elements 70-85 (FIG. 5) described above as performing the function of the compensation filter 60 (FIG. 4), the compensation filter 160a (FIG. 6), or the elements 170a, 175, 180a, and 185a (FIG. 7) described above as performing the function of the compensation filter 160a (FIG. 6). Furthermore, in step 215, a first compensated complex digital signal is generated as the sum of $x(n)$ and the complex compensation signal. Said first compensated complex digital signal may be the signal $y(n)$ in FIGS. 4 and 5, or the signal $v^{(i)}(n)$ in FIGS. 6 and 7. The method is ended in step 220.

The method may further comprise adaptively generating filter parameters of the compensation filter. Adaptively generating filter parameters of the compensation filter may e.g. comprise adaptively generating the complex-valued samples of the impulse response $f(n)$ or adaptively generating the real-valued samples of the impulse response $h_\Delta(n)$ and the real-valued parameter $\phi$ as described above with reference to FIGS. 4 and 5.

Figure 9:
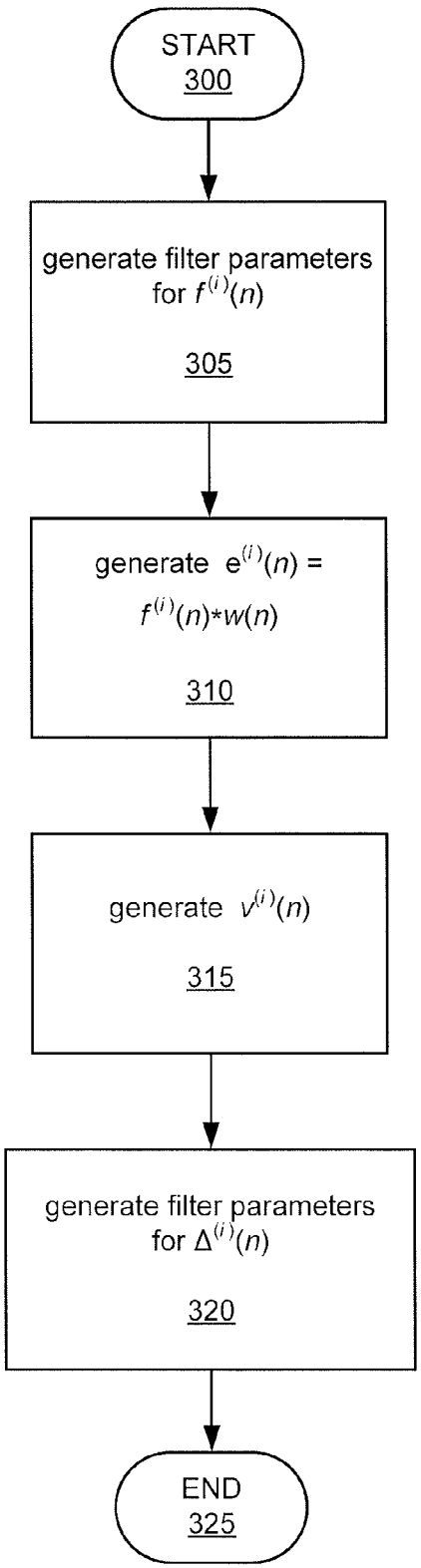

FIG. 9 is a flow chart indicating how adaptive generation of filter parameters can be performed according to an embodiment of the present invention, which is e.g. applicable to the embodiments of the signal-processing device 30 illustrated in FIGS. 6 and 7. The flow chart in FIG. 9 illustrates one iteration of the iterative process described above with reference to FIGS. 6 and 7. The iteration is started in step 300. In step 305, filter parameters for attaining the impulse response $f^{(i)}(n)$, wherein $f^{(i)}(n)$ is a default impulse response for the first iteration, wherein i=1, and $f^{(i)}(n)$ is based on $f^{(i-1)}(n)$ and $\Delta^{(i-1)}(n)$ for i>1. Furthermore, in step 310, the complex compensation signal, denoted $e^{(i)}(n)$, is generated as $e^{(i)}(n) = f^{(i)}(n) * w(n)$, wherein $w(n)$ denotes $a(n)$ (case 1) or $jb(n)$ (case 2). Moreover, in step 315, the first compensated complex digital signal $v^{(i)}(n)$ is generated as $v^{(i)}(n) = x(n) + e^{(i)}(n)$. In addition, the filter parameters determining $\Delta^{(i)}(n)$ are generated in step 320 by minimizing a cost function based on $u^{(i)}(n) = v^{(i)}(n) + \Delta^{(i)}(n) * w(n)$. The iteration is ended in step 320. In some embodiments, the iteration may also comprise generating a second compensated complex digital signal $y^{(i)}(n) = v^{(i)}(n) + \Delta^{(i)}(n) * w(n)$ based on the generated $\Delta^{(i)}(n)$ as described in the context of FIGS. 6-7.

As described above with reference to FIG. 7, the cost function may be based on a properness measure of $u^{(i)}(n)$. Furthermore, as is also described in the context of FIG. 7, the cost function may be a linear cost function, such as a cost function obtained by linearization of a nonlinear cost function based on $u^{(i)}(n)$.

The impulse responses $f^{(i)}(n)$ and $\Delta^{(i)}(n)$ may e.g. have any of the forms described above in the context of FIGS. 6 and 7 above. Furthermore, the steps 305 and 320 may e.g. comprise generating filter parameters in any of the ways described above with reference to FIGS. 6 and 7.

In some embodiments, the iterations for adaptively generating filter parameters may be continually executed as long as the signal-processing device 30 is in operation. In other embodiments, the iterations may be terminated, or ended, when a certain stop condition for ending the iterations is fulfilled. Such a condition may e.g. be that the maximum value (over all n) of $|\Delta^{(i)}(n)|$ is below a threshold value. The threshold value may e.g. be selected based on a system specification, computer simulations and/or measurements, e.g. to achieve certain degree of image rejection required by the system specification or to fulfill some other criterion of system specification.

Figure 10:
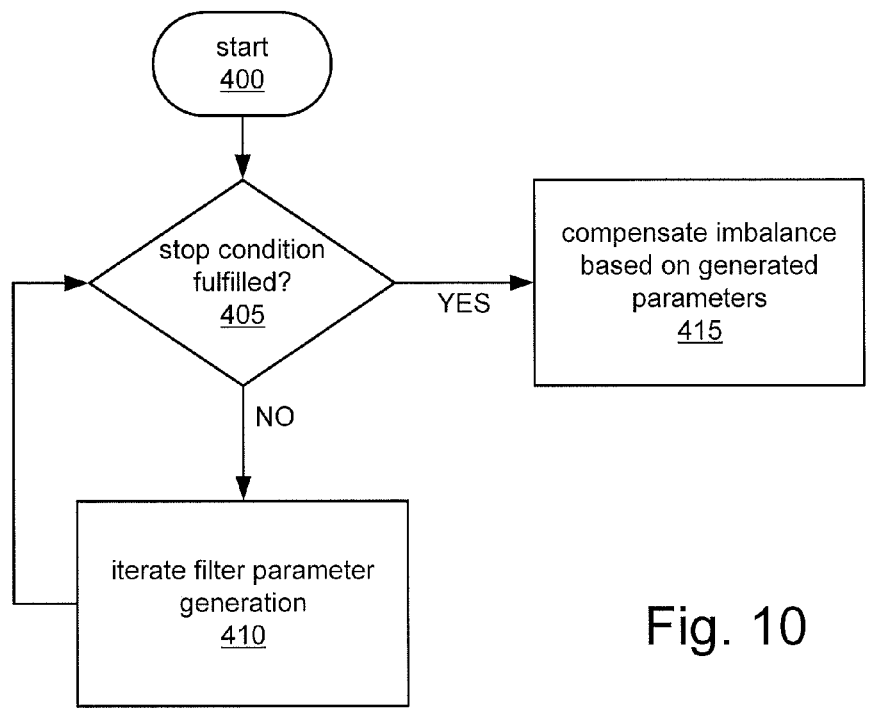

Such operation is illustrated by the flow chart in FIG. 10. In Step 400, the operation is started. In step 405, it is determining whether the stop condition is fulfilled. If the stop condition is not fulfilled, the filter parameter generation is iterated once more in step 410. Step 410 may e.g. be performed in accordance with the flow chart in FIG. 9. If the stop condition is fulfilled, the iterations are ended and compensation of the imbalance between the I signal path 12a and the Q signal path 12b based on filter parameters generated in the last iteration is continued in step 415.

Figure 11:
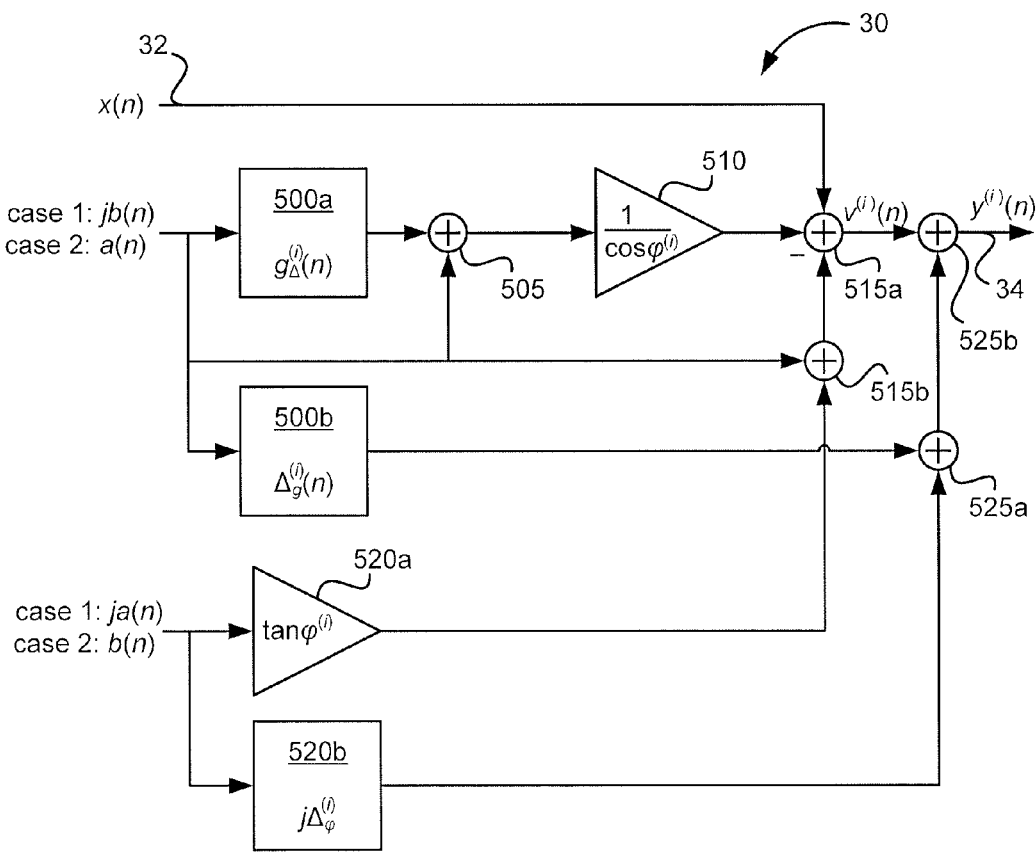
FIG. 11 is a block diagram of a signal-processing device according to an embodiment of the present invention.

A slight modification of the block diagram of the signal processing device 30 in FIG. 6, resulting in essentially the same function, except for a phase shift, at a computational complexity that is comparable to that of the block diagram of FIG. 6 is shown in FIG. 11. The embodiment illustrated in FIG. 11 is motivated as follows. Setting, for case 1, $$y(n) = x(n) + j\left(\tan(\varphi)a(n) + \left(\frac{g(n)}{\cos(\varphi)} - \delta(n)\right) * b(n)\right) \quad \text{(Eq. 27)}$$

or, for case 2, $$y(n) = x(n) + \tan(\varphi)b(n) + \left(\frac{g(n)}{\cos(\varphi)} - \delta(n)\right) * a(n) \quad \text{(Eq. 28)}$$

wherein, in both cases, $g(n)*h(n)=\delta(n)$, then $y(n)=p(n)$ for both cases. That is, $y(n)$ is a linear function of $z(n)$, from which $z(n)$ can be recovered by means of a linear equalizer. The definitions for $h(n)$, $p(n)$, and $\varphi$ for the two cases are given by Eq. 7-Eq. 11. Setting $$g_\Delta(n) = g(n) - \delta(n), \quad \text{(Eq 29)}$$

Eq. 27 can be rewritten as $$y(n) = x(n) + \tan(\varphi)ja(n) + \left(\left(\frac{g_\Delta(n) + \delta(n)}{\cos(\varphi)}\right) - \delta(n)\right) * jb(n) \quad \text{(Eq. 30)}$$

and Eq. 28 can be rewritten as $$y(n) = x(n) + \tan(\varphi)b(n) + \left(\left(\frac{g_\Delta(n) + \delta(n)}{\cos(\varphi)}\right) - \delta(n)\right) * a(n). \quad \text{(Eq. 31)}$$

It should be noted that $g_\Delta(n)$ is a real-valued sequence.

According to the embodiment illustrated in FIG. 11, the signal processing device 30 comprises a filter unit 500a, which is arranged to receive and filter a signal, which in the following is denoted $w_2(n)$. For case 1, $w_2(n)=jb(n)$, and for case 2, $w_2(n)=a(n)$ as indicated in FIG. 11. The filter unit 500a has a real-valued finite-length impulse response $g_\Delta^{(i)}(n)$, which can adopt nonzero values for n in a finite set K. For example, the set K may be an interval of length N, whereby $g_\Delta^{(i)}(n)$ has a finite length N. Furthermore, the signal processing device comprises an adder unit 505 arranged to generate the sum of the output signal of the filter unit 500a and $w_2(n)$. Moreover, the signal processing device 30 comprises a multiplication unit 510, which is arranged to multiply the sum generated by the adder unit 505 by a factor $1/\cos(\phi^{(i)})$, wherein $\phi^{(i)}$ is a real-valued parameter.

According to the embodiment illustrated in FIG. 11, the signal processing device 30 further comprises a multiplier unit 520a, which is arranged to multiply a signal $w_1(n)$ by a factor $\tan(\phi^{(i)})$. In case 1, the signal $w_1(n)=ja(n)$, and in case 2, $w_1(n)=b(n)$, as is illustrated in FIG. 11. Furthermore, the signal processing device 30 comprises adder units 515a and 515b which are adapted to generate a first compensated complex digital signal $v^{(i)}(n)$ as $$v^{(i)}(n) = x(n) + \tan(\varphi^{(i)})w_1(n) + \left(\left(\frac{g_\Delta^{(i)}(n) + \delta(n)}{\cos(\varphi^{(i)})}\right) - \delta(n)\right) * w_2(n) \quad \text{(Eq. 32)}$$

A comparison between Eq. 32 and Eq. 30-31 provides a motivation for the structure of the block diagram in FIG. 11. Similar to the adaptive generation of filter parameters described with reference to FIGS. 6-7 and 9, the parameter $\phi^{(i)}$ and sample values of a $g_\Delta^{(i)}(n)$ are adaptively generated in a number of iterations. Each iteration is identified below by the iteration index i. For the first iteration, wherein i=1, $g_\Delta^{(i)}(n)$ may be a default impulse response and $\phi^{(i)}$ may be assigned a default value, such as $g_\Delta^{(i)}(n)=0$ and $\phi^{(i)}=0$. For subsequent iterations, i.e. for i>1, $g_\Delta^{(i)}(n)$ is given by $g_\Delta^{(i)}(n)=g_\Delta^{(i-1)}(n)+\Delta_g^{(i-1)}(n)$ and $\phi^{(i)}$ is given by $\phi^{(i)}=\phi^{(i-1)}+\Delta_\phi^{(i-1)}$, wherein $\Delta_g^{(i-1)}(n)$ is an estimated impulse-response error of a preceding iteration and $\Delta_\phi^{(i-1)}$ is an estimated phase-parameter error of the preceding iteration. Similar to the adaptive generation of filter parameters described with reference to FIGS. 6-7 and 9, the estimated impulse response error $\Delta_g^{(i)}(n)$ and the estimated phase-parameter error $\Delta_\phi^{(i)}$ are generated by minimizing a cost function based on $$u^{(i)}(n) = v^{(i)}(n) + \sum_{k \in K}(\Delta_g^{(i)}(k)w_2(n-k) + \Delta_\varphi^{(i)}w_1(n-k)) \quad \text{(Eq. 33)}$$

The cost function based on $u^{(i)}(n)$ given by Eq. 33 may be based on a properness measure of $u^{(i)}(n)$ in the same way as for the adaptive generation of filter parameters described above with reference to FIGS. 6-7 and 9.

Similar to the embodiments of the signal processing device 30 illustrated in FIGS. 6 and 7, the signal processing device 30 according to the embodiment illustrated in FIG. 11 may be further adapted to generate a second compensated complex digital signal $$y^{(i)}(n) = v^{(i)}(n) + \sum_{k \in K}(\Delta_g^{(i)}(k)w_2(n-k) + \Delta_\varphi^{(i)}w_1(n-k))$$

based on the generated $\Delta_g^{(i)}(n)$ and $\Delta_\phi^{(i)}$. For this purpose, the signal processing device 30 may comprise a filter unit 500b adapted to generate the signal $$\sum_{k \in K}\Delta_g^{(i)}(k)w_2(n-k),$$

a filter unit 520b adapted to generate the signal $$\sum_{k \in K}\Delta_\varphi^{(i)}w_1(n-k),$$

and adder units 525a and 525b arranged for the generation of $y^{(i)}(n)$, as illustrated in FIG. 11.

This second compensated digital signal $y^{(i)}(n)$ may be the signal which is output on the output port 34. In other embodiments, the signal $v^{(i)}(n)$ may instead be output on the output port 34. In such embodiments, the filter units 500b and 520b and the adder units 525a and 525b may be omitted.

Figure 12:
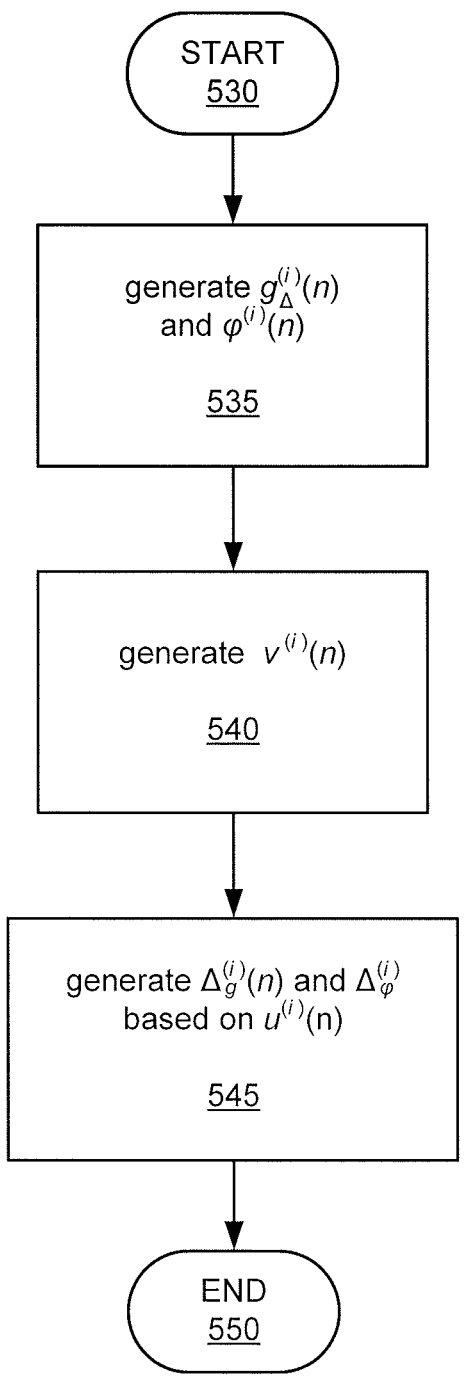
FIG. 12 is a flow chart for a method according to an embodiment of the present invention.

FIG. 12 is a flow chart indicating how adaptive generation of $\Delta_g^{(i)}(n)$ and $\Delta_\phi^{(i)}$ can be performed according to an embodiment of the present invention, which is applicable to the embodiment of the signal-processing device 30 illustrated in FIG. 11. Similar to the flow chart in FIG. 9, the flow chart in FIG. 12 illustrates one iteration of the iterative process described above with reference to FIG. 11. The iteration is started in step 530. In step 535, sample values of the finite-length real-valued impulse response $g_A^{(i)}(n)$ and the real-valued phase parameter $\phi^{(i)}$. For the first iteration, wherein i=1, $g_A^{(i)}(n)$ is generated as a default impulse response. For i>1, $g_A^{(i)}(n)$ is given by $g_A^{(i)}(n)=g_A^{(i-1)}(n)+\Delta_g^{(i-1)}(n)$. Similarly, for the first iteration, wherein i=1, the real-valued phase parameter $\phi^{(i)}$ is generated as a default value. For i>1, $\phi^{(i)}$ is generated as $\phi^{(i)}=\phi^{(i-1)}+\Delta_\phi^{(i-1)}$. In step 540, the first compensated complex digital signal $v^{(i)}(n)$ is generated according to Eq. 32. Moreover, in step 545, the estimated impulse response error $\Delta_g^{(i)}(n)$ and the estimated phase-parameter error $\Delta_\phi^{(i)}$ by minimizing said cost function based on $u^{(i)}(n)$ as defined by Eq. 33. The iteration may also comprise generating said second compensated digital signal $y^{(i)}(n)$.

In some embodiments, the iterations for adaptively generating $\Delta_g^{(i)}(n)$ and $\Delta_\phi^{(i)}$ may be continually executed as long as the signal-processing device 30 is in operation. In other embodiments, the iterations may be terminated, or ended, when a certain stop condition for ending the iterations is fulfilled. Such a condition may e.g. be that the maximum value (over all n) of $|\Delta_g^{(i)}(n)|$ is below a first threshold value and $|\Delta_\phi^{(i)}|$ is above a second threshold value. The threshold values may e.g. be selected based on a system specification, computer simulations and/or measurements, e.g. to achieve certain degree of image rejection required by the system specification or to fulfill some other criterion of system specification. Such operation may e.g. be performed in accordance with the flow chart in FIG. 10 described above, with step 410 performed in accordance with the flow chart in FIG. 12.

According to some embodiments of the present invention, there is provided means for compensating an imbalance between an I and a Q signal path of a quadrature transmitter arranged to transmit a radio-frequency signal $r_a(t)$ representing an uncompensated complex-valued digital signal $z(n)=c(n)+jd(n)$, wherein $c(n)$ is an uncompensated digital I component and $d(n)$ is an uncompensated digital Q component d(n).

Figure 13:
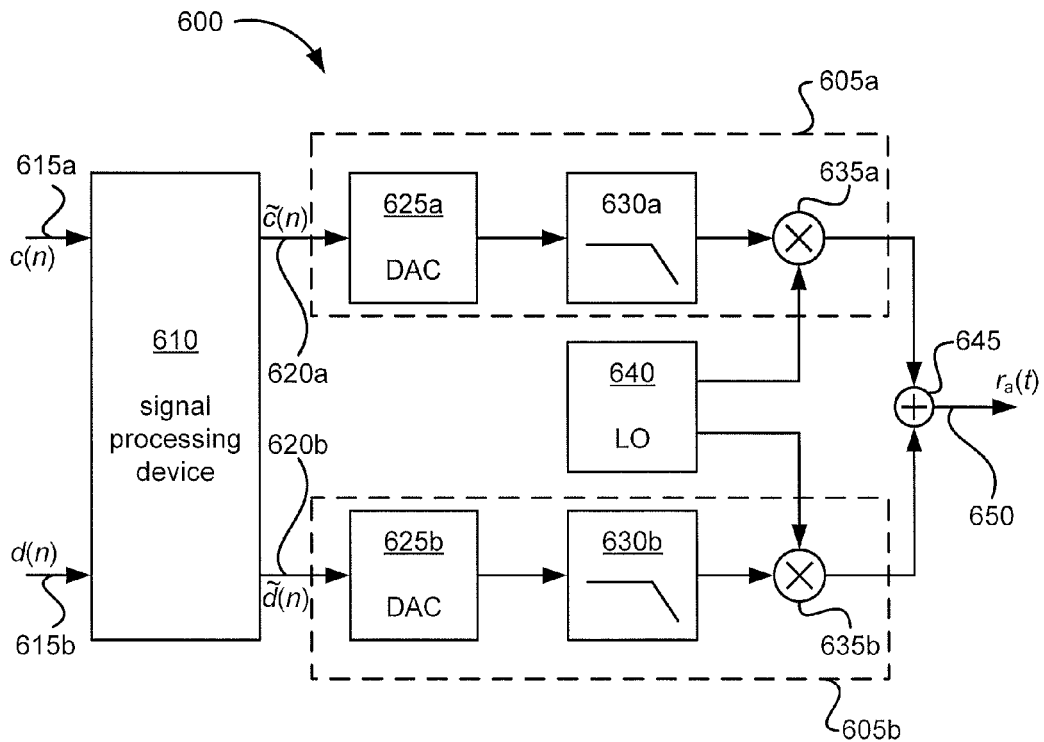
FIG. 13 is a block diagram of a quadrature transmitter according to an embodiment of the present invention.

FIG. 13 is a block diagram of a quadrature transmitter 600 according to an embodiment of the present invention. According to the embodiment, the quadrature transmitter 600 comprises an I signal path 605a and a Q signal path 605b. Furthermore, the quadrature transmitter 600 comprises a signal-processing device 610 for compensating an imbalance between the I signal path 605a and the Q signal path 605b. The signal-processing device 610 has an input port 615a for receiving the real-valued signal c(n) and an input port 615b for receiving the real-valued signal d(n). The signal-processing device 610 is adapted to generate a compensated complex-valued digital input signal $y(n)=\tilde{c}(n)+j\tilde{d}(n)$ based on the signal z(n). The signal $\tilde{c}(n)$ is a compensated digital I component, and the signal $\tilde{d}(n)$ is a compensated digital Q component. The signal processing device 610 is adapted to supply $\tilde{c}(n)$ to an input port of the I signal path 605a via an output port 620a of the signal processing device 610, and to supply $\tilde{d}(n)$ to an input port of the Q signal path 605b via an output port 620b of the signal processing device 610.

A difference between the arrangement of the signal processing device 610 in the quadrature transmitter 600 and the arrangement of the signal-processing device 30 in the quadrature receiver 8 (FIG. 2) is that, in the quadrature transmitter 600, the signal-processing device 610 is arranged to compensate for the I/Q imbalance by means of so called pre-distortion, whereas in the quadrature receiver 8, the signal processing device 30 is arranged to compensate for the I/Q imbalance by means of so called post-distortion.

Furthermore, according to the embodiment illustrated in FIG. 13, the quadrature transmitter 600 comprises a first digital-to-analog converter (DAC) 625a in the I signal path 605a, and a second DAC 625b in the Q signal path 605b, for converting $\tilde{c}(n)$ and $\tilde{d}(n)$, respectively, to corresponding analog representations. Furthermore, the quadrature transmitter 600 further comprises a filter 630a and a filter 630b in the I signal path 605a and the Q signal path 605b, respectively. The filters 630a and 630b are arranged to suppress unwanted frequency components output from the DACs 625a and 625b. In FIG. 13, the filters 630a and 630b are illustrated as LP filters. However, in other embodiments, depending on the signal band used, the filters 630a and 630b may instead be BP filters.

Moreover, the I signal path 605a comprises a mixer 635a, and the Q signal path 605b comprises a mixer 635b. The mixers 635a and 635b are adapted to receive the output signal from the filter 630a and the output signal from the filter 630b, respectively, on an input port. Furthermore, the quadrature receiver comprises an LO unit 640, which is adapted to generate LO signals, having a common frequency $f_0$, to the mixers 635a and 635b. Ideally, the LO signals supplied to the mixers 635a and 635b are provided in quadrature, i.e., ideally, there is a 90° (or $\pi/2$ radians) mutual phase shift between the LO signals. The mixers 635a and 635b are arranged to perform frequency up conversion of their respective input signals to an RF signal frequency band. In addition, the quadrature transmitter 600 comprises an analog adder circuit 645 for generating an RF output signal $r_a(t)$ as the sum of the output signals from the mixers 635a and 635b. The RF signal $r_a(t)$ is output on an output port 650 of the quadrature transmitter 600.

Figure 14:
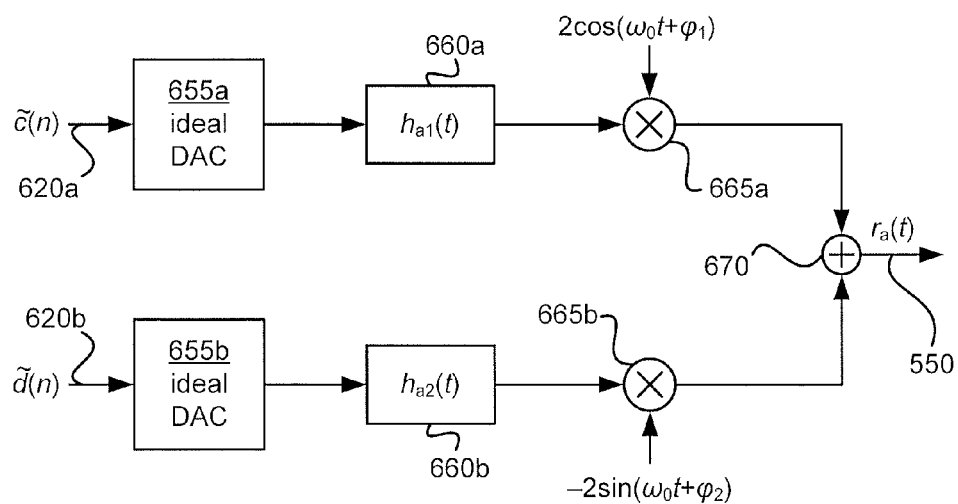
FIG. 14 is a block diagram of a model of a quadrature transmitter circuit.

FIG. 14 is a block diagram of a model of the quadrature transmitter 600, except for the signal processing device 610. The DACs 625a and 625b (FIG. 13) are modeled with ideal DACs 655a and 655b. The filters 630a and 630b (FIG. 13) are modeled with the blocks 660a and 660b, respectively, having impulse responses $h_{a1}(t)$ and $h_{a2}(t)$, as indicated in FIG. 3. Any gain mismatch between and (linear) dynamic behavior of the DACs 625a and 625b are lumped into the blocks 660a and 660b in the model of FIG. 14.

The mixers 635a and 635b, and the LO 640 (FIG. 13) are modeled with the multipliers 665a and 665b multiplying the output signals of the blocks 660a and 660b by $2\cos(\omega_0 t+\omega_1)$ and $-2\sin(\omega_0 t+\omega_2)$, respectively, where $\omega_0$ is $2\pi f_0$. With balanced I and Q signal path, $\phi_1=\phi_2$. The adder unit 645 (FIG. 13) is modeled with the adder 670. A difference between $\phi_1$ and $\phi_2$ results in an imbalance between the I and Q signal paths. Furthermore, a difference between $h_{a1}(t)$ and $h_{a2}(t)$ also contributes to the imbalance between the I and Q signal paths.

In the following derivation, $\tilde{c}_a(t)$ and $\tilde{d}_a(t)$ denote the analog signals corresponding to $\tilde{c}(n)$ and $\tilde{d}(n)$, respectively. It can be shown that the signal $r_a(t)$ can be written on the form $$r_a(t)=(c_1(t)e^{j\phi_1}+d_1(t)e^{j\phi_2})e^{j\omega_0 t}+j(c_1(t)e^{-j\phi_1}-d_1(t)e^{-j\omega_0 t}, \quad \text{(Eq. 34)}$$

where $c_1(t)=\tilde{c}_a(t)*h_1(t)$ and $d_1(t)=\tilde{d}_a(t)*h_2(t)$. Furthermore, let x(n) denote an equivalent unbalanced discrete-time baseband signal. That is, x(n) denotes a complex-valued signal which, when input to a (hypothetical) perfectly balanced quadrature transmitter, would result in the output signal $r_a(t)$. It can be shown that x(n) can be written on the form $$x(n) = g_1(n)y(n) + g_2(n)y^*(n), \quad \text{(Eq. 35)}$$

wherein $$g_1(n) = \frac{e^{j\varphi_1}h_1(n) + e^{j\varphi_2}h_2(n)}{2} \quad \text{(Eq. 36)}$$

and $$g_2(n) = \frac{e^{j\varphi_1}h_1(n) - e^{j\varphi_2}h_2(n)}{2}. \quad \text{(Eq. 37)}$$

In Eq. 36 and Eq. 37, $h_1(n)$ and $h_2(n)$ denote the discrete-time impulse responses corresponding to the continuous-time impulse responses $h_{a1}(t)$ and $h_{a2}(t)$, respectively.

Similarly to the receiver case, two different cases, denoted case 1 and case 2, are considered in the transmitter case as well. According to case 1, generating y(n) according to $$y(n)=z(n)+f(n)*c(n), \quad \text{(Eq. 38)}$$

wherein f(n) is a complex-valued impulse response $$f(n)=e^{j\phi}h(n)-\delta(n), \quad \text{(Eq. 39)}$$

$$h(n)*h_1(n)=h_2(n), \quad \text{(Eq. 40)}$$

and $$\phi=\phi_2-\phi_1 \quad \text{(Eq. 41)}$$

results in $$x(n)=e^{j\phi_2}h_2(n)z(n). \quad \text{(Eq. 42)}$$

Similarly, according to case 2, generating y(n) according to $$y(n)=z(n)+f(n)*jd(n), \quad \text{(Eq. 43)}$$

wherein f(n) is a complex-valued impulse response $$f(n)=e^{j\phi}h(n)-\delta(n), \quad \text{(Eq. 44)}$$

$$h(n)*h_2(n)=h_1(n), \quad \text{(Eq. 45)}$$

and $$\phi=\phi_1-\phi_2 \quad \text{(Eq. 46)}$$

results in $$x(n)=e^{j\phi_1}h_1(n)z(n). \quad \text{(Eq. 47)}$$

As can be seen from Eq. 41 and 47, generating y(n) according to Eq. 38 or Eq. 44 results in an x(n) that is a linearly distorted version of z(n). Such linear distortion can e.g. be compensated for by a linear equalizer in a receiver arranged to receive the signal $r_a(t)$ transmitted from the quadrature transmitter 600.

From Eq. 38-Eq. 47, it can be deduced that the same structures that are used for the signal-processing device 30 in FIGS. 4-7 in the receiver case can be utilized for the signal-processing device 610 in the transmitter case. The corresponding figures for the transmitter case can be obtained by
   replacing the input port 32 with a compound input port 615 comprising the input ports 615a and 615b of the signal processing device 610;
   replacing x(n) with z(n);
   replacing a(n) with c(n);
   replacing jb(n) with jd(n); and
   replacing the output port 34 with a compound output port 620 comprising the output ports 620a and 620b of the signal processing device 610;
in FIGS. 4-7. The above replacements are indicated within square brackets in FIGS. 4-7. FIGS. 4-7 are not described in any further detail for the transmitter case.

Consequently, according to embodiments of the present invention, there is provided method for compensating the imbalance between the I and the Q signal path 605a and 605b of the quadrature transmitter 600. Embodiments of the method are described below with reference to the flow charts in FIGS. 8-10, with suitable modifications to account for the differences between the transmitter and receiver cases. According to an embodiment of the method, with reference to FIG. 8, the method is started in step 200. In step 205, the uncompensated complex digital signal z(n)=c(n)+jd(n) is received, e.g. on the input ports 615a and 615b (FIG. 13). Furthermore, in step 210, a complex compensation signal is generated by filtering one of c(n) (case 1) and jd(n) (case 2) with a compensation filter having a complex-valued impulse response. Step 210 may e.g. be performed by the compensation filter 60 (FIG. 4), the elements 70-85 (FIG. 5) described above as performing the function of the compensation filter 60 (FIG. 4), the compensation filter 160a (FIG. 6), or the elements 170a, 175, 180a, and 185a (FIG. 7) described above as performing the function of the compensation filter 160a (FIG. 6). Furthermore, in step 215, a first compensated complex digital signal is generated as the sum of z(n) and the complex compensation signal. Said first compensated complex digital signal may be the signal y(n) in FIGS. 4 and 5, or the signal $v^{(i)}$(n) in FIGS. 6 and 7. The method is ended in step 220.

The method may further comprise adaptively generating filter parameters of the compensation filter. Adaptively generating filter parameters of the compensation filter may e.g. comprise adaptively generating the complex-valued samples of the impulse response f(n) (FIG. 4) or adaptively generating the real-valued samples of the impulse response $h_A$(n) and the real-valued parameter φ (FIG. 5). The adaptive generation of filter parameters may e.g. be performed using the general methods described in the Antilla transmitter paper referred to above in the "Background" section.

For the embodiments of the signal processing device 610 illustrated in FIGS. 6 and 7, the adaptive generation of filter parameters may be performed in an iterative process similar to that described for the corresponding embodiments of the signal processing device 30. However, a different cost function may be used. As in the Antilla transmitter paper, real down conversion (as opposed to quadrature (or complex) down conversion) of the signal $r_a(t)$, followed by analog-to-digital conversion, may be utilized to generate a real-valued signal $r_{BB}$(n), which can be used as a basis for the cost function. For example, in addition to $r_{BB}$(n), a signal $q_{BB}$(n) may be generated, which corresponds to the signal that would have resulted from real downconversion of a radio-frequency signal generated by inputting the signal z(t) to a quadrature transmitter having no imbalance between the I and Q signal paths. The cost function may be based on a difference between $r_{BB}$(n) and $q_{BB}$(n). For example, the cost function may be based on an $L^2$ norm or $L^\infty$ norm of said difference. Similar to the cost function in the receiver case, the cost function may be a linear cost function in the filter parameters to be estimated. For example, the linear cost function may be obtained as a linearization of a nonlinear cost function, such as said $L^2$ noun or $L^\infty$ norm.

According to an embodiment, an iteration of said iterative process may be performed in accordance with the flow chart shown in FIG. 9 (showing one iteration). The iteration is started in step 300. In step 305, filter parameters for attaining the impulse response $f^{(i)}(n)$, wherein $f^{(i)}(n)$ is a default impulse response for the first iteration, wherein i=1, and $f^{(i)}(n)$ is based on $f^{(i-1)}(n)$ and $\Delta^{(i-1)}(n)$ for i>1. Furthermore, in step 310, the complex compensation signal, denoted $e^{(i)}(n)$, is generated as $e^{(i)}(n)=f^{(i)}(n)*w(n)$, wherein w(n) denotes c(n) (case 1) or jd(n) (case 2). Moreover, in step 315, the first compensated complex digital signal $v^{(i)}(n)$ is generated as $v^{(i)}(n)=z(n)+e^{(i)}(n)$. In addition, the filter parameters determining $\Delta^{(i)}(n)$ are generated in step 320 by minimizing a cost function based on $r_{BB}(n)$. The iteration is ended in step 320. In some embodiments, the iteration may also comprise generating a second compensated complex digital signal $y^{(i)}(n)=v^{(i)}(n)+\Delta^{(i)}(n)*w(n)$ based on the generated $\Delta^{(i)}(n)$ as described in the context of FIGS. 6-7.

Similar to the receiver case, step 305 may comprise generating the samples of $f^{(i)}(n)$. Furthermore, step 320 may comprise generating the samples of $\Delta^{(i)}(n)$.

In some embodiments, the impulse response $f^{(i)}(n)$ may be on the form:

$$f^{(i)}(n)=h_A^{(i)}(n)+j\phi^{(k)}\delta(n)+j\phi^{(i)}h_A^{(i)}(n)+(e^{j\phi_{(i)}}-1-j\phi^{(i)})\cdot(\delta(n)+h_A^{(i)}(n)).$$

Furthermore, $\Delta^{(i)}(n)$ may be on the form $\Delta^{(i)}(n)=\Delta_h^{(i)}(n)+j\Delta_\phi^{(i)}$ for n belonging to a finite set of integers, for which $h_A^{(i)}(n)$ can adopt nonzero values, and $\Delta^{(i)}(n)=0$ outside said finite set of integers. $\Delta_\phi^{(i)}$ is a real-valued parameter and $\Delta_h^{(i)}(n)$ is a real-valued sequence. Step 320 may comprises generating the real-valued parameter $\Delta_\phi^{(i)}$ and the real-valued sequence $\Delta_h^{(i)}(n)$. Furthermore, step 305 may comprise generating the real-valued sequence $h_A^{(i)}(n)$ as $h_A^{(i)}(n)=h_A^{(i-1)}(n)+\Delta_h^{(i-1)}(n)$ and the real-valued parameter $\phi^{(i)}$ as $\phi^{(i)}=\phi^{(i-1)}+\Delta_\phi^{(i-1)}$ for i>1.

In some embodiments, the iterations for adaptively generating filter parameters may be continually executed as long as the signal-processing device 610 is in operation. In other embodiments, the iterations may be terminated, or ended, when a certain stop condition for ending the iterations is fulfilled. Such a condition may e.g. be that the maximum value (over all n) of $|\Delta^{(i)}(n)|$ is below a threshold value. The threshold value may e.g. be selected based on a system specification, computer simulations and/or measurements, e.g. to achieve certain degree of image rejection required by the system specification or to fulfill some other criterion of system specification.

Similar to the receiver case, such operation is illustrated by the flow chart in FIG. 10. In Step 400, the operation is started. In step 405, it is determining whether the stop condition is fulfilled. If the stop condition is not fulfilled, the filter parameter generation is iterated once more in step 410. Step 410 may e.g. be performed in accordance with the flow chart in FIG. 9. If the stop condition is fulfilled, the iterations are ended and compensation of the imbalance between the I signal path 605a and the Q signal path 605b based on filter parameters generated in the last iteration is continued in step 415.

Figure 15:
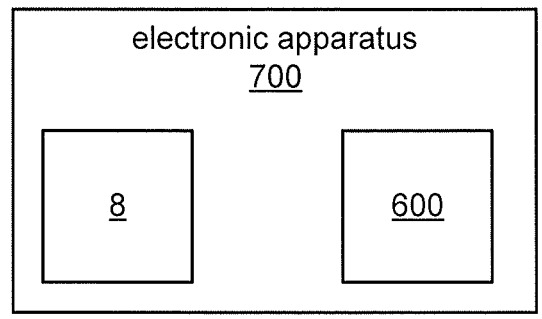
FIG. 15 schematically illustrates an electronic apparatus according to an embodiment of the present invention.

According to embodiments of the present invention, an electronic apparatus may comprise the quadrature receiver 8 and/or the quadrature transmitter 600. This is schematically illustrated in FIG. 15, showing an electronic apparatus 700 comprising the quadrature receiver 8 and the quadrature transmitter 600. For example, the electronic apparatus may comprise a transceiver (not shown), which in turn comprises the quadrature receiver 8 and/or the quadrature transmitter 600. The electronic apparatus may e.g. be, but is not limited to a mobile communication terminal or a radio base station.

It is an advantage of embodiments of the present invention described herein that compensation of imbalance between I and Q signal paths of a quadrature receiver or a quadrature transmitter can be accomplished with the same performance, in terms of image attenuation, as for the compensation circuit 1 illustrated in FIG. 1, but at a lower computational complexity. The lower computational complexity in turn results in a smaller amount of required computational resources, compared with the compensation circuit illustrated in FIG. 1. This can be utilized to reduce the required circuit area and/or the power consumption, compared with the compensation circuit illustrated in FIG. 1.

Figure 16:
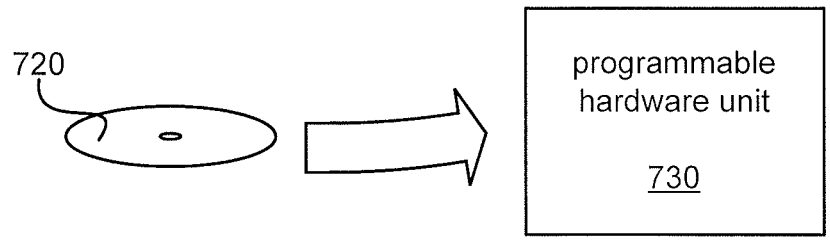
FIG. 16 schematically illustrates a computer-readable medium and a programmable hardware unit.

In some embodiments, the signal processing device 30 (FIGS. 2-7 and 11) and/or the signal processing device 610 (FIGS. 3-7 and 13) may be implemented as dedicated application-specific hardware units. Alternatively, said signal processing device 30 or 610, or parts thereof, may be implemented with programmable and/or configurable hardware units, such as but not limited to one or more field-programmable gate arrays (FPGAs), processors, or microcontrollers. Hence, embodiments of the present invention may be embedded in a computer program product, which enables implementation of the method and functions described herein, e.g. the embodiments of the methods described with reference to FIGS. 8-10 and 12. Therefore, according to embodiments of the present invention, there is provided a computer program product, comprising instructions arranged to cause a programmable hardware unit with processing capabilities, such as the aforementioned one or more processors or micro controllers, to perform the steps of any of the embodiments of said methods. The computer program product may comprise program code which is stored on a computer readable medium 720, as illustrated in FIG. 16, which can be loaded and executed by a programmable hardware unit 730 having processing capabilities, to cause it to perform the steps of any of the embodiments of said methods. The programmable hardware unit 730 having processing capabilities is preferably what normally is referred to as an embedded system of suitable format for integration within the signal processing device 30 or 610.

The signal processing device 30 (FIGS. 2-7 and 11) and/or the signal processing device 610 (FIGS. 3-7 and 13) may be fabricated by means of computer-aided fabrication. For example, in the case the signal processing device 30 or 610, or parts thereof, is implemented as an application-specific hardware unit in an IC, lithography masks for the fabrication of the signal processing device 30 or 610 may be fabricated by means of computer-aided fabrication based on hardware-description code describing a physical circuit layout of the signal processing device 30 or 610, such as but not limited to hardware-description code in the commonly used gdsII file format. Hardware description code describing a physical circuit layout may be computer generated, e.g. by means of synthesis and/or place-and-route computer program tools from another hardware-description code, such as but not limited to hardware-description code on a register-transfer level (RTL), or hardware description code in e.g. VHDL (VHSIC (Very-High-Speed Integrated Circuits) Hardware-Description Language), Verilog, or SystemC, or a combination thereof. Such hardware-description code may also be synthesized for configuring a configurable hardware unit, such as but not limited to an FPGA, to perform the functionality of the signal processing device 30 or 610. Other hardware-description languages than those listed above exist and the listed languages should not be interpreted as exhaustive or as limiting the invention.

Accordingly, in accordance with embodiments of the present invention, there is provided a hardware-description entity comprising computer-interpretable hardware-description code describing the signal processing device 30 or 610 and enabling computer-aided fabrication thereof as an application-specific hardware unit, through configuration of a configurable hardware unit, or a combination thereof.

The hardware-description entity may comprise a file or a set of files comprising the hardware-description code. The file or set of files may e.g. be stored on a computer-readable medium, such as the computer-readable medium 720 (FIG. 16).

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A method for compensating an imbalance between an in-phase, I, signal path and a quadrature, Q, signal path of a quadrature receiver adapted to generate a real-valued uncompensated digital I component $a(n)$ and a real-valued uncompensated digital Q component $b(n)$, together forming an uncompensated complex digital signal $x(n)=a(n)+jb(n)$, wherein j denotes an imaginary unit and n is a sequence index, the method comprising:
- generating a complex compensation signal by filtering one of $a(n)$ and $jb(n)$ with a compensation filter having a complex-valued impulse response;
- generating a first compensated complex digital signal as the sum of $x(n)$ and the complex compensation signal; and
- adaptively generating filter parameters of the compensation filter;
- wherein adaptively generating filter parameters of the compensation filter involves, for each of a number of iterations, where each iteration is identified by an iteration index i:
  - generating filter parameters for attaining an impulse response $f^{(i)}(n)$, wherein $f^{(i)}(n)$ is a default impulse response for the first iteration, wherein $i=1$, and $f^{(i)}(n)$ is based on $f^{(i-1)}(n)$ and $\Delta^{(i-1)}(n)$ for $i>1$, and $\Delta^{(i-1)}(n)$ is an estimated impulse-response error of a preceding iteration;
  - generating the complex compensation signal, denoted $e^{(i)}(n)$, as $e^{(i)}(n)=f^{(i)}(n) * w(n)$, wherein * denotes the convolution operator and $w(n)$ denotes one of $a(n)$ and $jb(n)$;
  - generating the first compensated complex digital signal denoted $v^{(i)}(n)$, as $v^{(i)}(n)=x(n)+e^{(i)}(n)$; and
  - generating filter parameters determining $\Delta^{(i)}(n)$ by minimizing a cost function based on $u^{(i)}(n)=v^{(i)}(n)+\Delta^{(i)}(n)*w(n)$.

2. The method according to claim 1, wherein the impulse response $f^{(i)}(n)$ is on the form:
$f^{(i)}(n)=h_A^{(i)}(n)+j\phi^{(k)}\delta(n)+j\phi h_A^{(i)}(n)+(e^{j\phi^{(i)}}-1-j\phi^{(i)})\cdot(\delta(n)+h_A^{(i)}(n))$; wherein $\delta(n)$ is the unit pulse, $\phi^{(i)}$ is a real-valued parameter and $h_A^{(i)}(n)$ is a real-valued sequence.

3. The method according to claim 2, wherein $\Delta^{(i)}(n)$ is on the form: $\Delta^{(i)}(n)=\Delta_h^{(i)}(n)+j\Delta_\phi^{(i)}$ for n belonging to a finite set of integers and $\Delta^{(i)}(n)=0$ outside the finite set of integers; and wherein $\Delta_\phi^{(i)}$ is a real-valued parameter and $\Delta_h^{(i)}(n)$ is a real-valued sequence; and
generating filter parameters determining $\Delta^{(i)}(n)$ comprises generating the real-valued parameter $\Delta_\phi^{(i)}$ as $\phi^{(i)}=\phi^{(i-1)}+\Delta_\phi^{(i-1)}$ for $i>1$, and the real-valued sequence $\Delta_h^{(i)}(n)$ as $h_A^{(i)}(n)=h_A^{(i-1)}(n)+\Delta_h^{(i-1)}(n)$ for $i>1$.

4. The method according to claim 1, wherein the impulse response of the compensation filter is on the form:
$h_A(n)+j\phi\delta(n)+j\phi h_A(n)+(e^{j\phi}-1-j\phi)\cdot(\delta(n)+h_A(n))$; wherein $\delta(n)$ is the unit pulse, $\phi$ is a real-valued parameter and $h_A(n)$ is a real-valued sequence; and
wherein adaptively generating filter parameters of the compensation filter comprises adaptively generating the real-valued parameter $\phi$ and the real-valued sequence $h_A(n)$.

5. A method for compensating an imbalance between an in-phase, I, signal path and a quadrature, Q, signal path of a quadrature receiver adapted to generate a real-valued uncompensated digital I component $a(n)$ and a real-valued uncompensated digital Q component $b(n)$, together forming an uncompensated complex digital signal $x(n)=a(n)+jb(n)$, wherein j denotes an imaginary unit and n is a sequence index, the method comprising:
for each of a number of iterations, where each iteration is identified by an iteration index i:
  - generating sample values of a finite-length real-valued impulse response $g_A^{(i)}(n)$ that can adopt nonzero values for n in a finite set K, wherein $g_A^{(i)}(n)$ is a default impulse response for the first iteration, wherein $i=1$, and $g_A^{(i)}(n)$ is given by $g_A^{(i)}(n)=g_A^{(i-1)}(n)+\Delta_g^{(i-1)}(n)$ for $i>1$, and $\Delta_g^{(i-1)}(n)$ is an estimated impulse-response error of a preceding iteration;
  - generating a real-valued phase parameter $\phi^{(i)}$ as a default value for the first iteration, where $i=1$, and as $\phi^{(i)}=\phi^{(i-1)}+\Delta_\phi^{(i-1)}$ for $i>1$, wherein $\Delta_\phi^{(i-1)}$ is an estimated phase-parameter error of the preceding iteration;
  - generating a first compensated complex digital signal, denoted $v^{(i)}(n)$, as $$v^{(i)}(n) = x(n) + \tan(\varphi^{(i)})w_1(n) + \left(\left(\frac{g_\Delta^{(i)}(n) + \delta(n)}{\cos(\varphi^{(i)})}\right) - \delta(n)\right) * w_2(n),$$

wherein * denotes the convolution operator, and either $w_1(n)=ja(n)$ and $w_2(n)=jb(n)$ or $w_1(n)=b(n)$ and $w_2(n)=a(n)$; and
generating the estimated impulse response error $\Delta_g^{(i)}(n)$ and the estimated phase-parameter error $\Delta_\phi^{(i)}$ by minimizing a cost function based on $$u^{(i)}(n) = v^{(i)}(n) + \sum_{k \in K}(\Delta_g^{(i)}(k)w_2(n-k) + \Delta_\varphi^{(i)}w_1(n-k)).$$

6. A signal-processing device for compensating an imbalance between an in-phase, I, signal path and a quadrature, Q, signal path of a quadrature receiver, wherein the quadrature receiver is adapted to generate a real-valued uncompensated digital I component $a(n)$ and a real-valued uncompensated digital Q component $b(n)$, together forming an uncompensated complex digital signal $x(n)=a(n)+jb(n)$, wherein j denotes an imaginary unit and n is a sequence index, wherein the signal-processing device is adapted to receive the uncompensated digital signal $x(n)$ and compensate said imbalance by performing the method according to claim 1.

7. A quadrature receiver comprising:
   an in-phase, I, signal path and a quadrature, Q, signal path for generating a real-valued uncompensated digital I component a(n) and a real-valued uncompensated digital Q component b(n), together forming an uncompensated complex digital signal x(n)=a(n)+jb(n), wherein j denotes an imaginary unit and n is a sequence index; and
   a signal-processing device according to claim 6 for compensating an imbalance between the I and the Q signal paths.

8. A method for compensating an imbalance between an in-phase, I, signal path and a quadrature, Q, signal path of a quadrature transmitter arranged to transmit a radio-frequency signal $r_a(t)$ representing an uncompensated complex-valued digital signal z(n)=c(n)+jd(n), wherein j denotes an imaginary unit, n is a sequence index, c(n) is an uncompensated digital I component, and d(n) is an uncompensated digital Q component, by generating a compensated complex-valued digital signal having a compensated digital I component, which is provided to the I signal path and a compensated digital Q component, which is provided to the Q signal path, the method comprising:
   generating a complex compensation signal by filtering one of c(n) and jd(n) with a compensation filter having a complex-valued impulse response;
   generating a first compensated complex digital signal as the sum of z(n) and the complex compensation signal; and
   adaptively generating filter parameters of the compensation filter;
   wherein adaptively generating filter parameters of the compensation filter involves, for each of a number of iterations, where each iteration is identified by an iteration index i:
      generating filter parameters for attaining an impulse response $f^{(i)}(n)$, wherein $f^{(i)}(n)$ is a default impulse response for the first iteration, wherein i=1, and $f^{(i)}(n)$ is based on $f^{(i-1)}(n)$ and $\Delta^{(i-1)}(n)$ for i>1, and $\Delta^{(i-1)}(n)$ is an estimated impulse-response error of a preceding iteration;
      generating the complex compensation signal denote $e^{(i)}(n)$, as $e^{(i)}(n)=f^{(i)}(n)*w(n)$, wherein * denotes the convolution operator and w(n) denotes one of c(n) and jd(n);
      generating the first compensated complex digital signal, denoted $v^{(i)}(n)$, as $v^{(i)}(n)=x(n)+e^{(i)}(n)$; and
      generating filter parameters determining $\Delta^{(i)}(n)$ by minimizing a cost function based on a real-valued signal $r_{BB}(n)$, which is obtained from real downconversion of the signal $r_a(t)$.

9. The method according to claim 8, further comprising generating a signal $q_{BB}(n)$ corresponding to a signal that would have resulted from real downconversion of a radio-frequency signal generated by inputting the signal z(t) to a quadrature transmitter having no imbalance between the I and Q signal paths, wherein the cost function is based on a difference between $r_{BB}(n)$ and $q_{BB}(n)$ based on an $L^2$ norm or $L^\infty$ norm of the difference.

10. The method according to claim 8, wherein the impulse response $f^{(i)}(n)$ is on the form:
   $f^{(i)}(n)=h_A^{(i)}(n)+j\phi^{(k)}\delta(n)+j\phi^{(i)}h_A^{(i)}(n)+(e^{j\phi^{(i)}}-1-j\phi^{(i)})\cdot(\delta(n)+h_A^{(i)}(n))$; wherein $\delta(n)$ is the unit pulse, $\phi^{(i)}$ is a real-valued parameter and $h_A^{(i)}(n)$ is a real-valued sequence.

11. The method according to claim 10, wherein $\Delta^{(i)}(n)$ is on the form: $\Delta^{(i)}(n)=\Delta_h^{(i)}(n)+j\Delta_\phi^{(i)}$ for n belonging to a finite set of integers and $\Delta^{(i)}(n)=0$ outside the finite set of integers; and wherein $\Delta_\phi^{(i)}$ is a real-valued parameter and $\Delta_h^{(i)}(n)$ is a real-valued sequence; and wherein generating filter parameters determining $\Delta^{(i)}(n)$ comprises generating the real-valued parameter $\Delta_\phi^{(i)}$ as $\phi^{(i)}=\phi^{(i-1)}+\Delta_\phi^{(i-1)}$ for i>1, and the real-valued sequence $\Delta_h^{(i)}(n)$ as $h_A^{(i)}(n)=h_A^{(i-1)}(n)+\Delta_h^{(i-1)}(n)$ for i>1.

12. The method according to claim 8, wherein the impulse response of the compensation filter is on the form:
   $h_A(n)+j\phi\delta(n)+j\phi h_A(n)+(e^{j\phi}-1-j\phi)\cdot(\delta(n)+h_A(n))$; wherein $\delta(n)$ is the unit pulse, $\phi$ is a real-valued parameter and $h_A(n)$ is a real-valued sequence; and
   wherein adaptively generating filter parameters of the compensation filter comprises adaptively generating the real-valued parameter $\phi$ and the real-valued sequence $h_A(n)$.

13. A signal-processing device for compensating an imbalance between an in-phase, I, signal path and a quadrature, Q, signal path of a quadrature transmitter for transmitting a radio-frequency signal $r_a(t)$ representing an uncompensated complex-valued digital signal z(n)=c(n)+jd(n), wherein j denotes an imaginary unit, n is a sequence index, c(n) is an uncompensated digital I component, and d(n) is an uncompensated digital Q component, wherein the signal processing device is adapted to receive the uncompensated complex-valued digital signal z(n) and generate a compensated digital I component, to be provided to the I signal path, and a compensated digital Q component, to be provided to the Q signal path, by performing the method according to claim 8 for compensating the imbalance.

14. A quadrature transmitter for transmitting a radio-frequency signal $r_a(t)$ representing an uncompensated complex-valued digital signal z(n)=c(n)+jd(n), comprising:
   an in-phase, I, signal path and a quadrature, Q, signal path arranged to receive a compensated digital I component and a compensated digital Q component, respectively, for generating the radio-frequency signal $r_a(t)$; and
   a signal-processing device according to claim 13 for compensating an imbalance between the I and the Q signal paths.

15. An electronic apparatus comprising the quadrature receiver according to claim 7.

16. A non-transitory computer readable medium having stored thereon a computer program product comprising computer program code means for executing the method according to claim 1 when the computer program code means are run by an electronic device having computer capabilities.

17. An electronic apparatus comprising the quadrature transmitter according to claim 14.

18. A non-transitory computer readable medium having stored thereon a computer program product comprising computer program code means for executing the method according to claim 5 when the computer program code means are run by an electronic device having computer capabilities.

19. A non-transitory computer readable medium having stored thereon a computer program product comprising computer program code means for executing the method according to claim 8 when the computer program code means are run by an electronic device having computer capabilities.

* * * * *